United States Patent
Yamazaki et al.

(10) Patent No.: US 10,755,667 B2
(45) Date of Patent: Aug. 25, 2020

(54) DATA PROCESSOR

(71) Applicant: Semiconductor Energy Laboratory Co., Ltd., Atsugi-shi, Kanagawa-ken (JP)

(72) Inventors: Shunpei Yamazaki, Setagaya (JP); Yoshiharu Hirakata, Ebina (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 47 days.

(21) Appl. No.: 15/891,577

(22) Filed: Feb. 8, 2018

(65) Prior Publication Data
US 2018/0166041 A1    Jun. 14, 2018

Related U.S. Application Data

(63) Continuation of application No. 14/537,267, filed on Nov. 10, 2014, now Pat. No. 9,892,710.

(30) Foreign Application Priority Data

Nov. 15, 2013  (JP) .................................. 2013-237254

(51) Int. Cl.
G09G 5/00      (2006.01)
G06F 1/16      (2006.01)
G06F 3/147     (2006.01)

(52) U.S. Cl.
CPC ........... *G09G 5/003* (2013.01); *G06F 1/1626* (2013.01); *G06F 1/1643* (2013.01); (Continued)

(58) Field of Classification Search
CPC ...... G06F 3/147; G06F 1/1626; G06F 1/1643; G06F 1/1652; G06F 1/1692; (Continued)

(56) References Cited

U.S. PATENT DOCUMENTS 6,125,286 A    9/2000  Jahagirdar et al.
6,304,763 B1   10/2001 Jahagirdar et al.
(Continued)

FOREIGN PATENT DOCUMENTS

CN    001202079 A    12/1998
CN    001375976 A    10/2002
(Continued)

OTHER PUBLICATIONS

Taiwanese Office Action (Application No. 103139056) dated May 9, 2018.
(Continued)

*Primary Examiner* — Bryan Earles
(74) *Attorney, Agent, or Firm* — Robinson Intellectual Property Law Office; Eric J. Robinson

(57) ABSTRACT

A novel human interface excellent in operability is provided. Furthermore, a novel data processor excellent in operability is provided. Furthermore, a novel data processor, a novel display device, or the like is provided. An input/output device that receives image data and supplies positional data, and an arithmetic device that supplies the image data and receives the positional data are included. The input/output device includes a first region, a second region, and a bend portion between the first region and the second region. Each of the first region and the second region includes a display portion and a positional data input portion that overlaps the display portion. The arithmetic device includes an arithmetic unit and a storage unit that stores a program to be executed by the arithmetic unit.

21 Claims, 13 Drawing Sheets

(52) U.S. Cl.
CPC ............ *G06F 1/1652* (2013.01); *G06F 3/147* (2013.01); *G06F 1/1692* (2013.01); *G06F 2203/04102* (2013.01); *G09G 2330/021* (2013.01); *G09G 2340/04* (2013.01); *G09G 2340/0464* (2013.01); *G09G 2340/0492* (2013.01); *G09G 2380/02* (2013.01)

(58) Field of Classification Search
CPC .... G06F 2203/04102; G09G 2330/021; G09G 2340/04; G09G 2340/0464; G09G 2340/0492; G09G 2380/02; G09G 5/003
See application file for complete search history.

(56) References Cited

U.S. PATENT DOCUMENTS

| | | | |
|---|---|---|---|
| 6,907,276 | B2 | 6/2005 | Toba |
| 8,248,341 | B2 | 8/2012 | Neugebauer |
| 8,402,391 | B1 | 3/2013 | Doray et al. |
| 8,415,208 | B2 | 4/2013 | Takayama et al. |
| 8,516,728 | B2 | 8/2013 | Jung |
| 8,610,118 | B2 | 12/2013 | Yamazaki et al. |
| 8,610,155 | B2 | 12/2013 | Hatano et al. |
| 8,665,238 | B1 | 3/2014 | Gossweiler, III et al. |
| 8,723,172 | B2 | 5/2014 | Shu et al. |
| 8,723,824 | B2 | 5/2014 | Myers et al. |
| 8,842,097 | B2 | 9/2014 | Norieda |
| 8,952,870 | B2 | 2/2015 | Matsumoto |
| 8,976,141 | B2 | 3/2015 | Myers et al. |
| 9,030,427 | B2 | 5/2015 | Yasumatsu |
| 9,411,451 | B2 | 8/2016 | Myers et al. |
| 9,501,179 | B2 * | 11/2016 | Yilmaz ................... G06F 1/169 |
| 9,791,949 | B2 | 10/2017 | Myers et al. |
| 2002/0044208 | A1 | 4/2002 | Yamazaki et al. |
| 2002/0086711 | A1 | 7/2002 | Flannery |
| 2002/0137551 | A1 | 9/2002 | Toba |
| 2003/0201974 | A1 | 10/2003 | Yin |
| 2006/0197750 | A1 | 9/2006 | Kerr et al. |
| 2008/0303782 | A1 | 12/2008 | Grant et al. |
| 2010/0060548 | A1 | 3/2010 | Choi et al. |
| 2010/0117975 | A1 | 5/2010 | Cho |
| 2010/0123160 | A1 * | 5/2010 | Hatano ............... H01L 27/3251 257/99 |
| 2010/0317409 | A1 | 12/2010 | Jiang et al. |
| 2011/0050657 | A1 | 3/2011 | Yamada |
| 2011/0126141 | A1 | 5/2011 | King et al. |
| 2011/0180794 | A1 | 7/2011 | Yamazaki |
| 2012/0032979 | A1 | 2/2012 | Blow et al. |
| 2012/0217516 | A1 | 8/2012 | Hatano et al. |
| 2012/0320009 | A1 | 12/2012 | Liu |
| 2013/0002133 | A1 | 1/2013 | Jin et al. |
| 2013/0032414 | A1 | 2/2013 | Yilmaz et al. |
| 2013/0033434 | A1 | 2/2013 | Richardson et al. |
| 2013/0076649 | A1 | 3/2013 | Myers et al. |
| 2013/0178248 | A1 | 7/2013 | Kim |
| 2013/0180882 | A1 | 7/2013 | Hamers et al. |
| 2013/0194761 | A1 | 8/2013 | Kim |
| 2013/0222998 | A1 | 8/2013 | Cho et al. |
| 2013/0300697 | A1 | 11/2013 | Kim et al. |
| 2013/0335453 | A1 | 12/2013 | Lim et al. |
| 2014/0099999 | A1 | 4/2014 | Hatano et al. |
| 2014/0240289 | A1 | 8/2014 | Myers et al. |
| 2014/0306260 | A1 | 10/2014 | Yamazaki et al. |
| 2014/0319550 | A1 | 10/2014 | Yamazaki et al. |
| 2014/0361980 | A1 | 12/2014 | Iwaki et al. |
| 2014/0375660 | A1 | 12/2014 | Tamaki |
| 2015/0009128 | A1 | 1/2015 | Matsumoto |
| 2015/0035777 | A1 | 2/2015 | Hirakata et al. |
| 2015/0062525 | A1 | 3/2015 | Hirakata |
| 2015/0103023 | A1 | 4/2015 | Iwaki |
| 2018/0052540 | A1 | 2/2018 | Myers et al. |

FOREIGN PATENT DOCUMENTS

| | | |
|---|---|---|
| CN | 103828334 A | 5/2014 |
| DE | 19823882 | 12/1998 |
| EP | 1220515 A | 7/2002 |
| EP | 1244275 A | 9/2002 |
| EP | 3125508 A | 2/2017 |
| JP | 09-128147 A | 5/1997 |
| JP | 11-017579 A | 1/1999 |
| JP | 2002-077331 A | 3/2002 |
| JP | 2002-247170 A | 8/2002 |
| JP | 2002-281130 A | 9/2002 |
| JP | 2003-174153 A | 6/2003 |
| JP | 2003-345286 A | 12/2003 |
| JP | 2006-005712 A | 1/2006 |
| JP | 2007-195063 A | 8/2007 |
| JP | 2007-326259 A | 12/2007 |
| JP | 2009-105817 A | 5/2009 |
| JP | 2011-055998 A | 3/2011 |
| JP | 2012-190794 A | 10/2012 |
| JP | 2012-212409 A | 11/2012 |
| JP | 2012-230615 A | 11/2012 |
| JP | 2012-252554 A | 12/2012 |
| JP | 2013-138438 A | 7/2013 |
| JP | 2013-228786 A | 11/2013 |
| JP | 2014-535086 | 12/2014 |
| KR | 2014-0066253 A | 5/2014 |
| TW | 201115740 | 5/2011 |
| WO | WO-2011/062085 | 5/2011 |
| WO | WO-2013/018698 | 2/2013 |
| WO | WO-2013/048881 | 4/2013 |

OTHER PUBLICATIONS

International Search Report (Application No. PCT/IB2014/065780) dated Feb. 24, 2015.
Written Opinion (Application No. PCT/IB2014/065780) dated Feb. 24, 2015.
"Lesson 03 Let's learn the basic operation of Galaxy S", https://dekiru.net/article/1629/, Nov. 16, 2010.

* cited by examiner

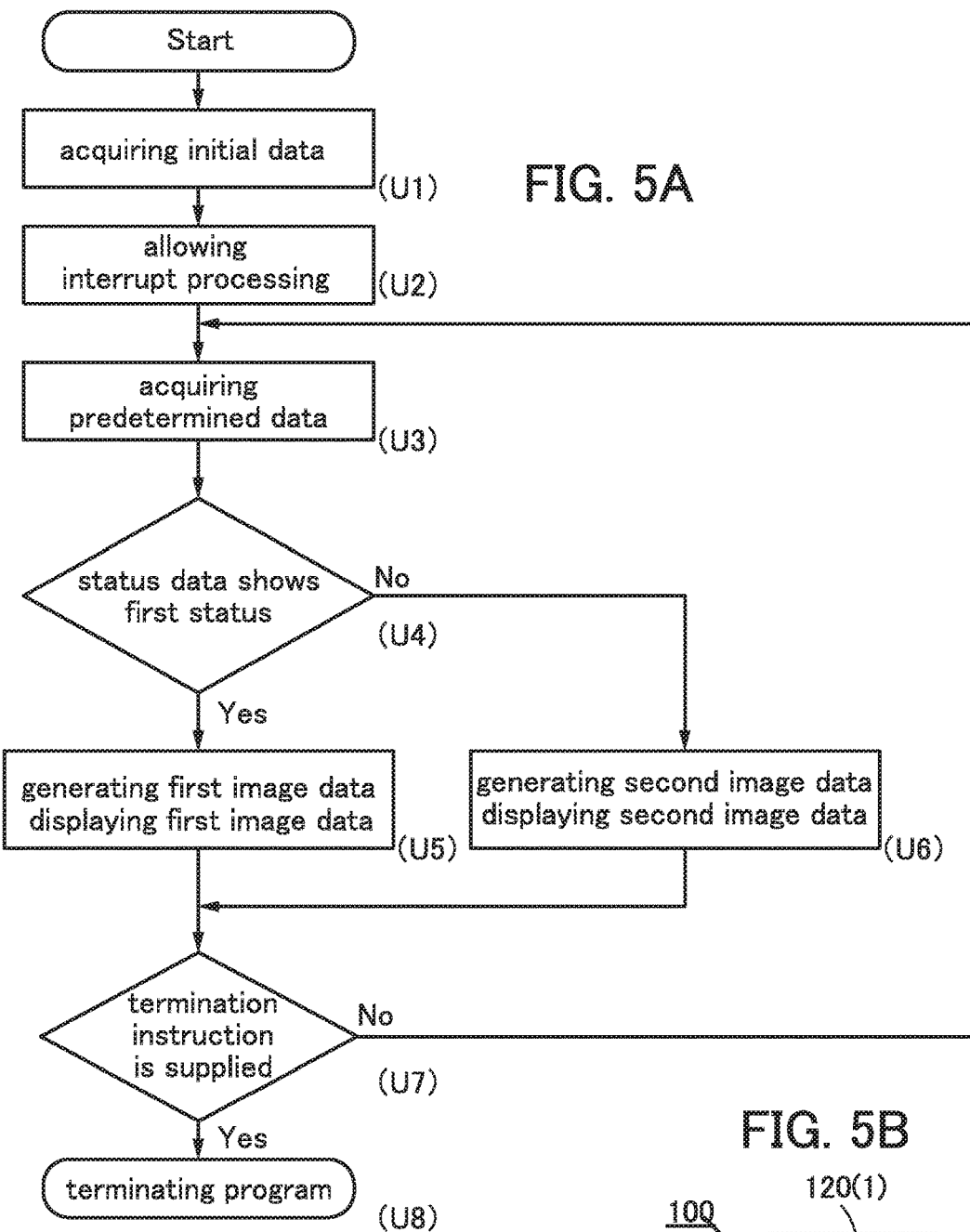
FIG. 5A
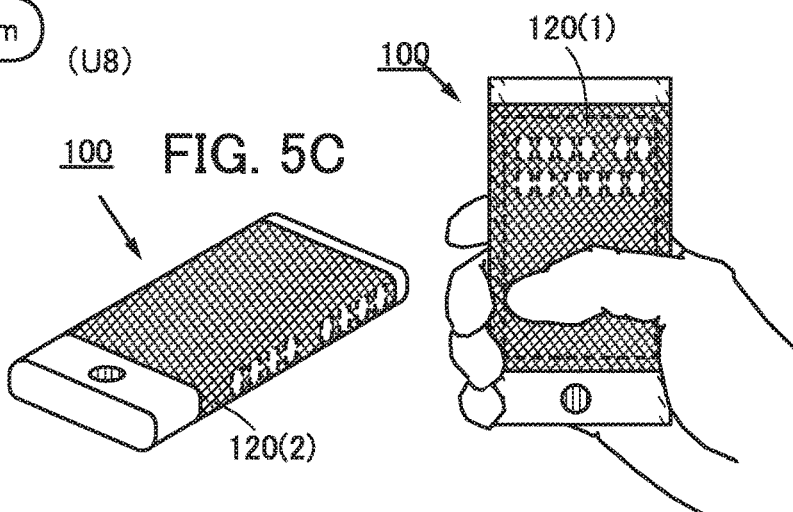
FIG. 5B
FIG. 5C

FIG. 13A1
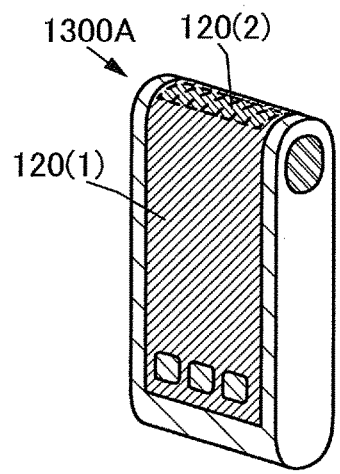
FIG. 13A2
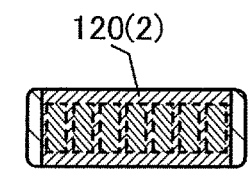
FIG. 13A3
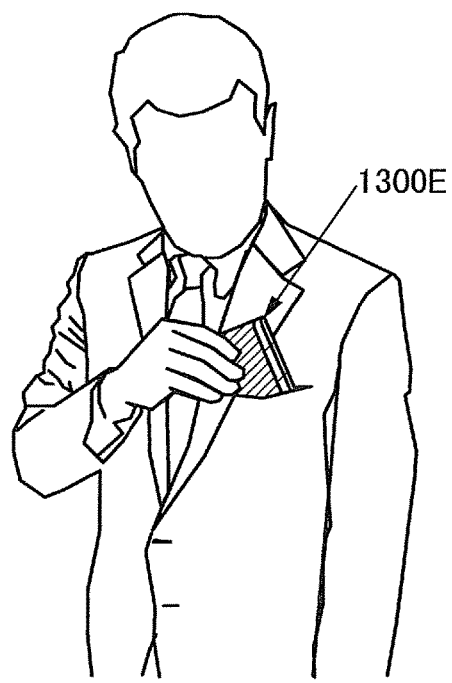
FIG. 13B1
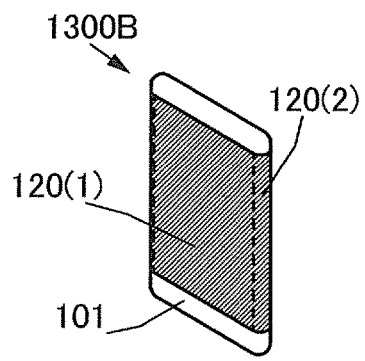
FIG. 13B2
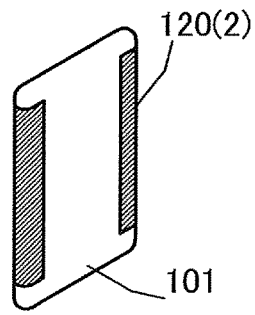
FIG. 13C1
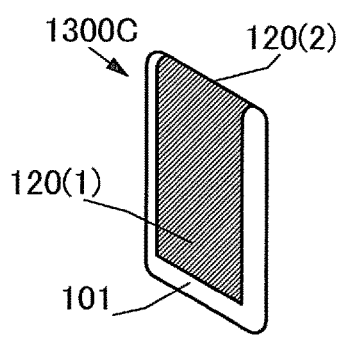
FIG. 13C2
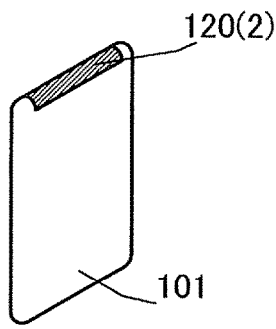

DATA PROCESSOR

TECHNICAL FIELD

One embodiment of the present invention relates to a method and a program for processing and displaying image data, and a device including a storage medium in which the program is stored. In particular, one embodiment of the present invention relates to a method for processing and displaying image data by which an image including data processed by a data processor provided with a display portion is displayed, a program for displaying an image including data processed by a data processor provided with a display portion, and a data processor including a storage medium in which the program is stored.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

BACKGROUND ART

The social infrastructures relating to means for transmitting data have advanced. This has made it possible to acquire, process, and send out many pieces and various kinds of data with the use of a data processor not only at home or office but also at other visiting places.

With this being the situation, portable data processors are under active development.

For example, portable data processors are often used while being carried around by a user, and force might be accidentally applied, by dropping, to the data processors and display devices included in them. As an example of a display device that is not easily broken, a display device having high adhesiveness between a structure body by which a light-emitting layer is divided and a second electrode layer is known (Patent Document 1).

[Patent Document]
[Patent Document 1] Japanese Published Patent Application No. 2012-190794

DISCLOSURE OF INVENTION

An object of one embodiment of the present invention is to provide a novel human interface excellent in operability. Another object of one embodiment of the present invention is to provide a novel data processor excellent in operability. Another object of one embodiment of the present invention is to provide a novel data processor, a novel display device, or the like.

Note that the descriptions of these objects do not disturb the existence of other objects. One embodiment of the present invention need not achieve all the objects. Other objects will be apparent from and can be derived from the description of the specification, the drawings, the claims, and the like.

One embodiment of the present invention is a data processor including an input/output device that receives first image data and second image data and supplies first positional data and second positional data, and an arithmetic device that supplies the first image data and the second image data and receives the first positional data and the second positional data.

The input/output device includes a first region, a second region, and a bend portion between the first region and the second region.

The first region includes a first display portion and a first positional data input portion that overlaps with the first display portion. The second region includes a second display portion and a second positional data input portion that overlaps with the second display portion.

The first display portion receives the first image data. The first positional data input portion supplies the first positional data.

The second display portion receives the second image data. The second positional data input portion supplies the second positional data.

In the data processor, the arithmetic device includes an arithmetic unit and a storage unit that stores a program to be executed by the arithmetic unit. The arithmetic unit generates the first image data or the second image data based on the first positional data or the second positional data.

The above-described data processor of one embodiment of the present invention includes the input/output device that receives the image data and supplies the positional data, and the arithmetic device that supplies the image data and receives the positional data. The input/output device includes the first region, the second region, and the bend portion between the first region and the second region. Each of the first region and the second region includes the display portion and the positional data input portion that overlaps with the display portion. The arithmetic device includes the arithmetic unit and the storage unit that stores the program to be executed by the arithmetic unit. Thus, image data can be generated based on positional data supplied from one of the two regions and displayed on the other of the two regions.

Consequently, a novel data processor can be provided.

Furthermore, one embodiment of the present invention is the above-described data processor with the program including a first step of generating the first image data, a second step of allowing an interrupt processing, a third step of displaying the first image data on the first display portion, a fourth step of selecting a fifth step when a termination instruction is supplied in the interrupt processing or selecting the third step when no termination instruction is supplied in the interrupt processing, and the fifth step of terminating the program.

Furthermore, the interrupt processing includes a sixth step of selecting a seventh step when an instruction is supplied from the second positional data input portion or selecting an eighth step when no instruction is supplied from the second positional data input portion, the seventh step of generating the first image data based on the instruction, and the eighth step of returning from the interrupt processing.

The above-described data processor of one embodiment of the present invention includes the step of generating the first image data based on the second positional data. Thus, image data to be displayed on the first region can be determined with the use of the second positional data input portion. Consequently, a novel data processor can be provided.

Furthermore, one embodiment of the present invention is the above-described data processor with the interrupt processing including a step of selecting the eighth step when a termination instruction is supplied from the second positional data input portion, after the sixth step.

The above-described data processor of one embodiment of the present invention includes the step of returning from the interrupt processing and supplying the termination instruction when the positional data supplied from the second positional data input portion is related to the termination instruction. Thus, the termination instruction can be supplied with the use of the second region. Consequently, a novel data processor can be provided.

Furthermore, one embodiment of the present invention is the above-described data processor with the program including a first step of acquiring initial data including status data, a second step of allowing an interrupt processing, a third step of acquiring predetermined data, a fourth step of selecting a fifth step when the status data shows a first status or selecting a sixth step when the status data shows a second status, the fifth step of generating the first image data based on the predetermined data and displaying the first image data on the first display portion, the sixth step of generating the second image data based on the predetermined data and displaying the second image data on the second display portion, a seventh step of selecting an eighth step when a termination instruction is supplied in the interrupt processing or selecting the third step when no termination instruction is supplied in the interrupt processing, and the eighth step of terminating the program.

The interrupt processing includes a ninth step of selecting a tenth step when an instruction to set the status data is supplied or selecting an eleventh step when no instruction to set the status data is supplied, the tenth step of updating the status data based on the supplied instruction, and the eleventh step of returning from the interrupt processing.

The above-described data processor of one embodiment of the present invention includes the step of acquiring the predetermined data, the step of setting the status data, and the step of generating the image data including the predetermined data based on the set status data and displaying the image data on the display portion. Thus, the image including the predetermined data can be displayed on the region set based on the status data. Consequently, a novel data processor can be provided.

Furthermore, one embodiment of the present invention is the above-described data processor with the program including a first step of allowing an interrupt processing, a second step of selecting a third step when there is an incoming email/call or selecting a fifth step when there is no incoming email/call, the third step of acquiring data on a sender/caller, a fourth step of generating the second image data including the data on the sender/caller and displaying the second image data, the fifth step of selecting a sixth step when a termination instruction is supplied in the interrupt processing or selecting the second step when no termination instruction is supplied in the interrupt processing, and the sixth step of terminating the program.

The interrupt processing includes a seventh step of selecting an eighth step in a case where the incoming email/call is to be opened/answered or selecting a ninth step in a case where the incoming email/call is not to be opened/answered, the eighth step of opening/answering the incoming email/call, the ninth step of stopping displaying the second image data, and a tenth step of returning from the interrupt processing.

The above-described data processor of one embodiment of the present invention includes the step of displaying the phone number of the incoming call in its standby state and data related to the phone number on the second display portion. Thus, the phone number of the incoming call and data related thereto can be displayed. Consequently, a novel data processor can be provided.

According to one embodiment of the present invention, a novel human interface excellent in operability can be provided. Furthermore, a novel data processor excellent in operability can be provided. Furthermore, a novel data processor, a novel display device, or the like can be provided. Note that the description of these effects does not disturb the existence of other effects. One embodiment of the present invention does not necessarily achieve all the objects listed above. Other effects will be apparent from and can be derived from the description of the specification, the drawings, the claims, and the like.

BRIEF DESCRIPTION OF DRAWINGS

In the accompanying drawings:

FIGS. 2A, 2B, 2C1, 2C2, and 2D are schematic views illustrating a structure of a data processor of an embodiment;

FIG. 5A is a flow chart illustrating a program stored in a data processor of an embodiment, and FIGS. 5B and 5C each illustrate a data processor of an embodiment;

FIGS. 13A1, 13A2, 13A3, 13B1, 13B2, 13C1 and 13C2 each illustrate a data processor of an embodiment.

BEST MODE FOR CARRYING OUT THE INVENTION

Figure 1:
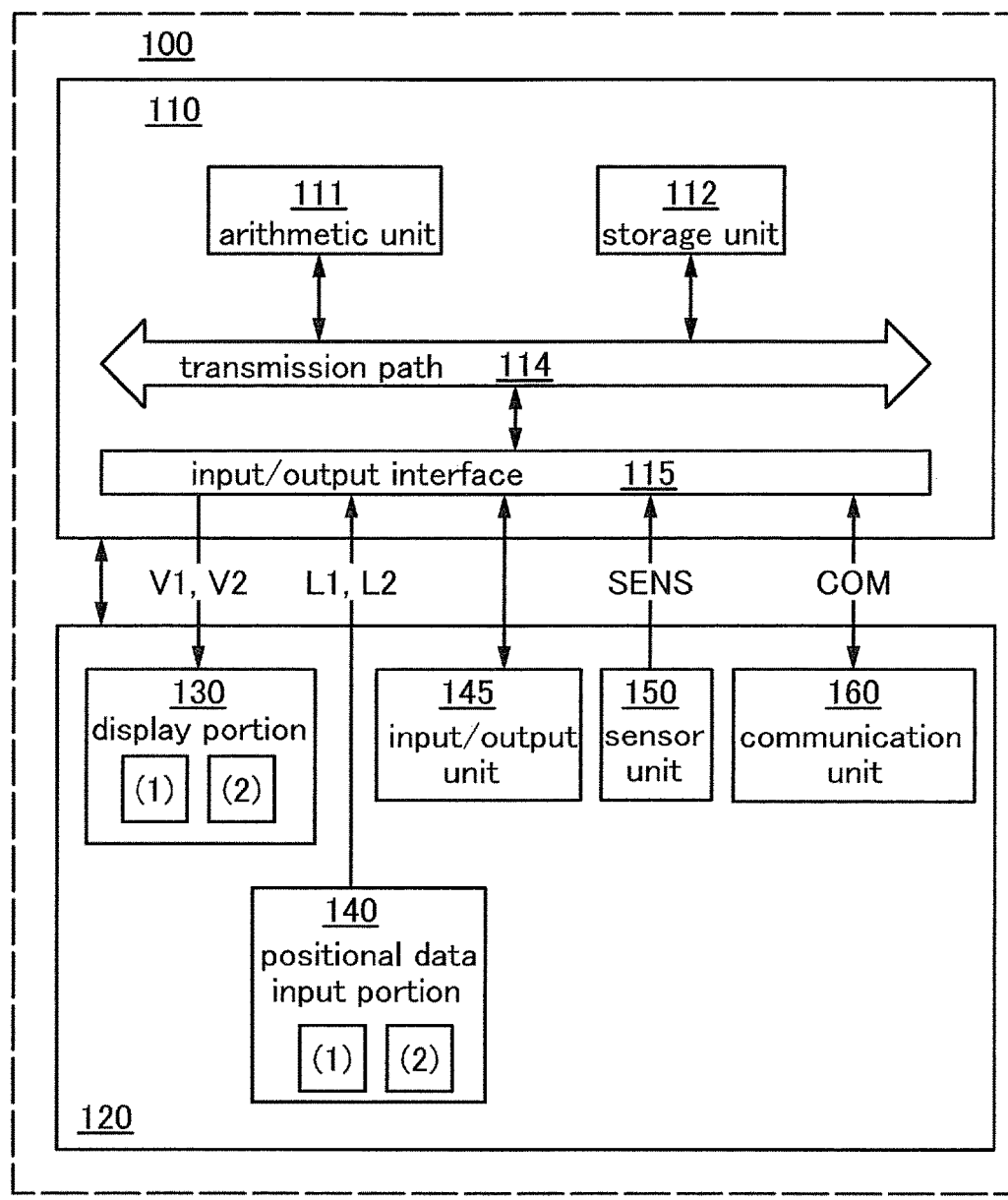
FIG. 1 is a block diagram illustrating a structure of a data processor of an embodiment.

A data processor of one embodiment of the present invention includes an input/output device that receives image data and supplies positional data, and an arithmetic device that supplies the image data and receives the positional data. The input/output device includes a first region, a second region, and a bend portion between the first region and the second region. Each of the first region and the second region includes a display portion and a positional data input portion that overlaps with the display portion. The arithmetic device includes an arithmetic unit and a storage unit that stores a program to be executed by the arithmetic unit. The program generates image data based on positional data.

Thus, image data can be generated based on positional data supplied from one of the two regions and displayed on the other of the two regions. Consequently, a novel human interface excellent in operability can be provided. Furthermore, a novel data processor excellent in operability can be provided. Furthermore, a novel data processor or a novel display device can be provided.

Embodiments will be described in detail with reference to the drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below. Note that in the structures of the invention described below, the same portions or portions having similar functions are denoted by the same reference numerals in different drawings, and description of such portions is not repeated.

Embodiment 1

In this embodiment, a structure of a data processor of one embodiment of the present invention will be described with reference to FIG. 1, FIGS. 2A, 2B, 2C1, 2C2, and 2D.

FIG. 1 is a block diagram illustrating a structure of a data processor 100 of one embodiment of the present invention.

Figure 2A:
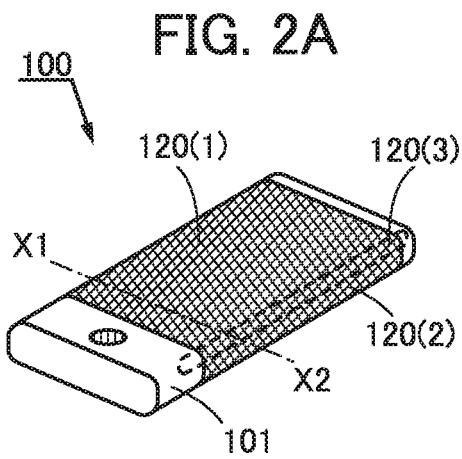
Figure 2B:
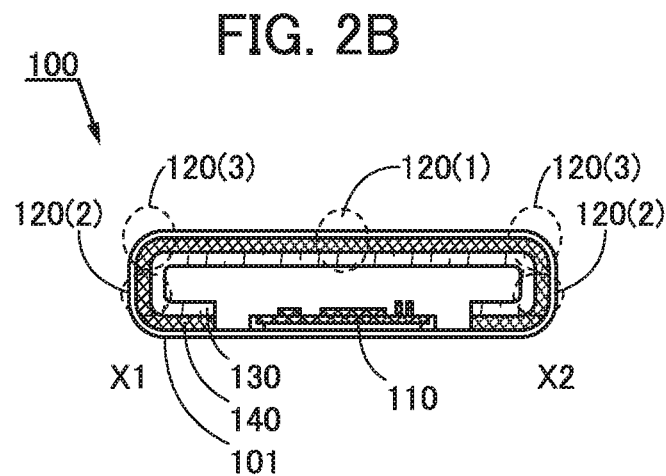

FIG. 2A is a schematic view showing the appearance of the data processor 100 of one embodiment of the present invention. FIG. 2B is a cross-sectional view illustrating a structure of a cross section taken along line X1-X2 in FIG. 2A.

FIG. 2C1 is a schematic view showing the appearance of a positional data input portion and a display portion which can be used in the data processor 100.

FIG. 2C2 is a schematic view showing the appearance of a proximity sensor 142 which can be used in the positional data input portion.

Figure 2D:
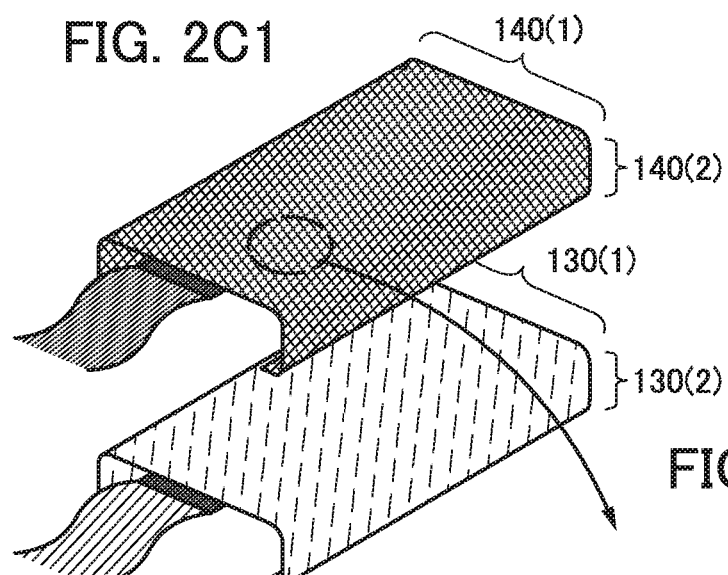
Figure 2D:
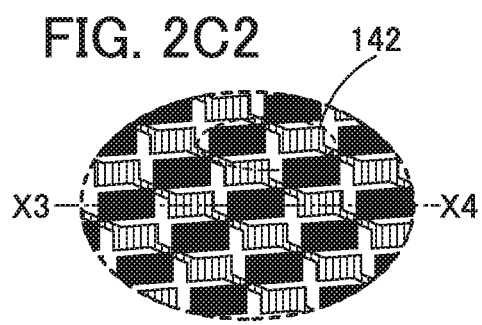
Figure 2D:
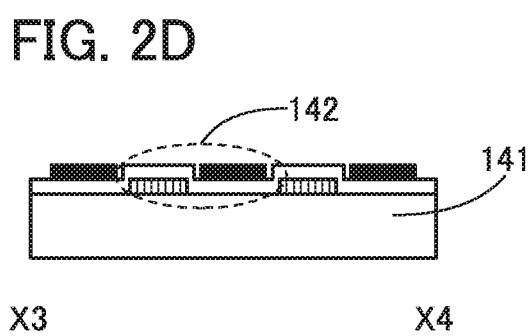

FIG. 2D is a cross-sectional view illustrating a cross-sectional structure of the proximity sensor 142 taken along line X3-X4 in FIG. 2C2.

<Structural Example of Data Processor>

The data processor 100 described in this embodiment includes an input/output device 120 that receives first image data V1 and second image data V2 and supplies first positional data L1 and second positional data L2, and an arithmetic device 110 that supplies the first image data V1 and the second image data V2 and receives the first positional data L1 and the second positional data L2 (see FIG. 1).

The input/output device 120 includes a first region 120(1), a second region 120(2), and a bend portion 120(3) between the first region 120(1) and the second region 120(2) (see FIGS. 2A and 2B).

The first region 120(1) includes a first display portion 130(1) and a first positional data input portion 140(1) that overlaps with the first display portion 130(1) (see FIGS. 2B and 2C1).

The second region 120(2) includes a second display portion 130(2) and a second positional data input portion 140(2) that overlaps with the second display portion 130(2).

The first display portion 130(1) receives the first image data V1, and the first positional data input portion 140(1) supplies the first positional data L1 (see FIG. 1).

The second display portion 130(2) receives the second image data V2, and the second positional data input portion 140(2) supplies the second positional data L2.

The arithmetic device 110 includes an arithmetic unit 111 and a storage unit 112 that stores a program to be executed by the arithmetic unit 111. The arithmetic unit 111 generates the first image data V1 or the second image data V2 based on the first positional data L1 or the second positional data L2.

The data processor 100 described as an example in this embodiment includes the input/output device 120 that receives image data and supplies positional data, and the arithmetic device 110 that supplies the image data and receives the positional data. The input/output device 120 includes the first region 120(1), the second region 120(2), and the bend portion 120(3) between the first region 120(1) and the second region 120(2). Each of the first region 120(1) and the second region 120(2) includes the display portion and the positional data input portion that overlaps with the display portion. The arithmetic device 110 includes the arithmetic unit 111 and the storage unit 112 that stores a program to be executed by the arithmetic unit 111. Thus, image data can be generated based on positional data supplied from one of the two regions and displayed on the other of the two regions. Consequently, a novel data processor can be provided.

The input/output device 120 may include an input/output unit 145 that supplies and receives data, a sensor unit 150 that senses data outside the data processor 100 and supplies sensed data SENS, and a communication unit 160 that supplies and receives communication data COM.

The arithmetic device 110 may include a transmission path 114 that supplies and receives data, and an input/output interface 115 that supplies and receives data.

Individual components included in the data processor will be described below. Note that these components or units cannot be clearly distinguished and one component/unit also serves as another component/unit or include part of another component/unit in some cases.

For example, a touch panel in which a display portion is overlapped with a touch sensor serves as the positional data input portion 140 as well as the display portion 130.

Note that although this embodiment describes a structure where the positional data input portion 140 is placed on a display surface side of the display portion 130 as an example, one embodiment of the present invention is not limited to this structure. Specifically, the display portion 130 may be placed on a sensing surface side of the positional data input portion 140, or the display portion 130 and the positional data input portion 140 may be integrated into one unit. In other words, either of an on-cell touch panel or an in-cell touch panel may be employed.

<<Entire Structure>>

The data processor 100 includes the input/output device 120 and the arithmetic device 110 (see FIG. 1).

The arithmetic device 110 includes the arithmetic unit 111 and the storage unit 112.

The arithmetic device 110 may further include the transmission path 114 and the input/output interface 115.

<<Input/Output Device>>

The input/output device 120 includes the display portion 130 and the positional data input portion 140. The input/output device 120 receives a variety of data and can supply a variety of data.

The input/output device 120 may further include the input/output unit 145, the sensor unit 150, and the communication unit 160.

The input/output device 120 includes the first region 120(1), the second region 120(2), and the bend portion 120(3) (see FIGS. 2A and 2B).

In a case where the input/output device 120 has a continuous curved surface that includes the first region 120(1) and the second region 120(2), and the first region 120(1) and the second region 120(2) are continuous, for example, the bend portion 120(3) includes a portion with the smallest curvature radius that appears in a section of the curved surface. Although the example in which the input/output device 120 has two second regions 120(2) is shown in FIG. 2B, one embodiment of the present invention is not limited to this example. The input/output device 120 may have only one second region 120(2), or three or more second regions 120(2).

The first region 120(1) includes the first display portion 130(1) and the first positional data input portion 140(1).

The second region 120(2) includes the second display portion 130(2) and the second positional data input portion 140(2). The bend portion 120(3) may also have a display portion and a positional data input portion that overlaps with the display portion. With such a structure, positional data supplied from the bend portion 120(3) may be used instead of the second positional data L2.

For example, two second regions 120(2) may be arranged to face each other (see FIG. 2B). The distance between the two second regions 120(2) is, for example, 17 cm or less, preferably 9 cm or less, and more preferably 7 cm or less. If the distance is short, positional data in a large area of the first positional data input portion 140(1) can be identified or supplied with the use of the thumb of a hand holding the data processor 100.

<<Positional Data Input Portion>>

The positional data input portion 140 senses an approaching object and supplies positional data of the approaching object to the arithmetic device 110. In a case where the positional data input portion 140 has a light-transmitting property, the positional data input portion 140 can be provided closer to a user of the data processor 100 than the display portion 130 is.

For example, the user of the data processor 100 can supply a variety of operating instructions, e.g., a termination instruction (an instruction to terminate a program), to the data processor 100 by making his/her finger, palm, or the like in proximity to the positional data input portion 140.

For example, the proximity sensors 142 may be arranged in a matrix form over a flexible substrate 141 to constitute the positional data input portion 140 (see FIGS. 2C1, 2C2, and 2D).

The positional data input portion 140 includes the first positional data input portion 140(1) and the second positional data input portion 140(2).

The first positional data input portion 140(1) supplies the first positional data L1 and the second positional data input portion 140(2) supplies the second positional data L2.

The first positional data input portion 140(1) and the second positional data input portion 140(2) may be driven as one positional data input portion.

The positional data input portion 140 may be divided into the first positional data input portion 140(1) and the second positional data input portion 140(2) which are driven independently of each other.

Here, X1-X2 direction is set as a row direction, and the direction crossing the row direction is set as a column direction. A plurality of scan lines extending in the row direction, a plurality of signal lines extending in the column direction, and the proximity sensors 142 each including an electrode electrically connected to one scan line and an electrode electrically connected to one signal line are provided in a matrix form in the positional data input portion 140. The plurality of scan lines cut across the first positional data input portion 140(1) and the second positional data input portion 140(2).

The positional data input portion 140 may be divided and driven in the following manner: a proximity sensor having an electrode electrically connected to the signal line provided in the first positional data input portion 140(1) and a proximity sensor having an electrode electrically connected to the signal line provided in the second positional data input portion 140(2) are driven independently of each other.

Specifically, when only the first positional data input portion 140(1) is used, only the proximity sensor provided in the first positional data input portion 140(1) is driven.

When only the second positional data input portion 140(2) is used, only the proximity sensor provided in the second positional data input portion 140(2) is driven.

Note that the scan lines provided across the first positional data input portion 140(1) and the second positional data input portion 140(2) supply signals for driving the proximity sensors to the first positional data input portion 140(1) and the second positional data input portion 140(2) at the same timing. Therefore, in a case where the proximity sensor provided in the first positional data input portion 140(1) and the proximity sensor provided in the second positional data input portion 140(2) are driven independently of each other, a signal for driving the proximity sensor provided in the first positional data input portion 140(1) and a signal for driving the proximity sensor provided in the second positional data input portion 140(2) need to be supplied at different timings.

For example, in a case where the data processor 100 is used with its housing 101 being held by the user's hand, drive of the second positional data input portion 140(2) may be stopped so that only the first positional data input portion 140(1) is driven. Stopping drive of the second positional data input portion 140(2) can reduce malfunctions caused by the second positional data L2 supplied from the second positional data input portion 140(2) that senses the hand holding the data processor 100.

For example, in a case where the sum of power consumed by the first positional data input portion 140(1) and power consumed by the second positional data input portion 140(2) is larger than power consumed only by the first positional data input portion 140(1), drive of the second positional data input portion 140(2) may be stopped so that only the first positional data input portion 140(1) is driven. Specifically, stopping drive of the second positional data input portion 140(2) in a standby state of the data processor 100 can reduce power consumption.

A sensor such as a capacitor or an imaging element can be used as the proximity sensor 142 as long as it can sense an object (e.g., a finger or a palm) approaching or contacting the sensor. Note that a substrate with capacitors arranged in a matrix form can be called a capacitive touch sensor, and a substrate with an imaging element can be called an optical touch sensor (see FIGS. 2C2 and 2D).

As the flexible substrate 141, a resin that is thin enough to have flexibility can be used. Specific examples of the resin include polyester, polyolefin, polyamide (e.g., nylon, aramid), polyimide, polycarbonate, and an acrylic resin.

Alternatively, a normal substrate not having flexibility can be used. For example, a glass substrate, a quartz substrate, or a semiconductor substrate can be used.

Specific structural examples that can be used for the positional data input portion 140 will be described in Embodiments 5, 6, and 7.

<<Display Portion>>

The display portion 130 is not particularly limited as long as it can display image data that is supplied thereto (see FIG. 2C1).

The display portion 130 includes the first display portion 130(1) and the second display portion 130(2).

The first display portion 130(1) displays the first image data V1 that is supplied thereto, and the second display portion 130(2) displays the second image data V2 that is supplied thereto.

The first display portion 130(1) and the second display portion 130(2) may be driven as one display portion.

The first display portion 130(1) and the second display portion 130(2) may be driven as different display portions.

For example, when the data processor 100 is in a standby state, drive of the first display portion 130(1) may be stopped so that only the second display portion 130(2) is driven. Stopping drive of the first display portion 130(1) can reduce power consumption.

Specific structural examples that can be used for the display portion 130 will be described in Embodiments 5, 6, and 7.

<<Sensor Unit>>

The sensor unit 150 senses the states of the data processor 100 and the circumstances and supplies sensed data SENS (see FIG. 1).

The sensor unit 150 senses acceleration, a direction, pressure, a global positioning system (GPS) signal, temperature, or humidity, for example, and may supply data thereof.

<<Communication Unit>>

The communication unit 160 supplies data COM supplied from the arithmetic device 110 to a device or a communication network outside the data processor 100.

Furthermore, the communication unit 160 acquires the data COM from the device or communication network outside the data processor 100 and supplies the data COM.

The data COM can include a variety of instructions or the like in addition to phonetic data and image data. For example, the data COM can include an operating instruction to generate or delete the first image data V1 and the second image data V2, given to the arithmetic unit 111.

A communication means for connecting to the external device or external communication network, e.g., a hub, a router, or a modem, can be used for the communication unit 160. The connection method is not limited to a method using a wire, and a wireless method (e.g., radio wave or infrared rays) may be used.

<<Input/Output Unit>>

As the input/output unit 145, for example, a camera, a microphone, a read-only external storage unit, an external storage unit, a scanner, a speaker, or a printer can be used (see FIG. 1).

Specifically, as a camera, a digital camera, a digital video camera, or the like can be used.

As an external storage unit, a hard disk, a removable memory, or the like can be used. As a read-only external storage unit, a CD-ROM, a DVD-ROM, or the like can be used.

<<Arithmetic Device>>

The arithmetic device 110 includes the arithmetic unit 111, the storage unit 112, the input/output interface 115, and the transmission path 114 (see FIG. 1).

The arithmetic device 110 receives the first positional data L1 and the second positional data L2 and supplies the first image data V1 and the second image data V2.

For example, the arithmetic device 110 supplies the first image data V1 and the second image data V2 each including an image used for operation of the data processor 100.

The second image data V2 is displayed on the second display portion 130(2). Furthermore, by touching the second positional data input portion 140(2) overlapping with the image used for operation, which is displayed on the second display portion 130(2), with a finger or the like, the user of the data processor 100 can supply an operating instruction related to the image to the arithmetic device 110.

<<Arithmetic Unit>>

The arithmetic unit 111 executes a program stored in the storage unit 112. For example, when positional data related to the position where an image used for operation is supplied, the arithmetic unit 111 executes a program that is related in advance to the image.

<<Storage Unit>>

The storage unit 112 stores the program to be executed by the arithmetic unit 111.

Examples of the program to be executed by the arithmetic unit 111 in the arithmetic device 110 will be described in Embodiments 2 to 4.

<<Input/Output Interface and Transmission Path>>

The input/output interface 115 supplies and receives data.

The transmission path 114 can supply data, which is supplied to the arithmetic unit 111, the storage unit 112, and the input/output interface 115. In addition, the arithmetic unit 111, the storage unit 112, and the input/output interface 115 can supply data, which is supplied to the transmission path 114.

The data processor 100 includes the arithmetic device 110, the input/output device 120, and a housing 101 (see FIG. 2B).

<<Housing>>

The housing 101 protects the arithmetic device 110 or the like from stress applied from the outside.

Metal, plastic, glass, ceramics, or the like can be used for the housing 101.

This embodiment can be combined with any of the other embodiments in this specification as appropriate.

Embodiment 2

In this embodiment, a structure of a data processor of one embodiment of the present invention will be described with reference to FIGS. 3A to 3C.

Figure 3A:
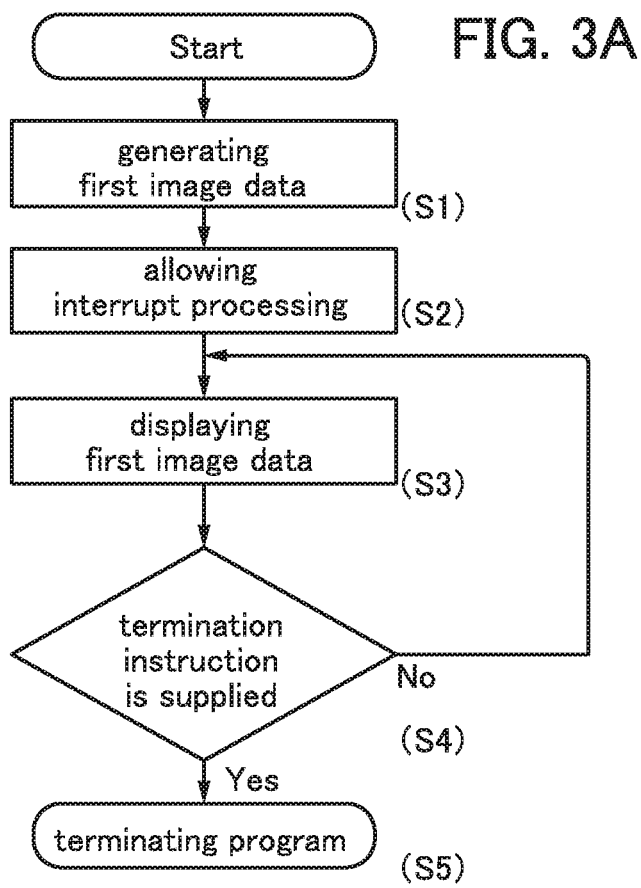
FIGS. 3A and 3B are flow charts illustrating a program stored in a data processor of an embodiment.
Figure 3B:
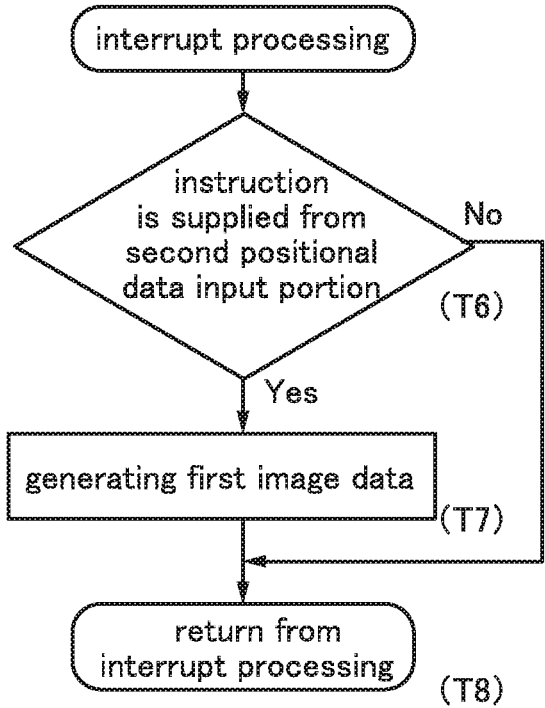
Figure 3C:
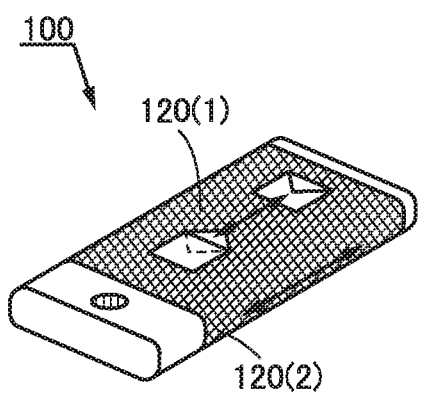
FIG. 3C illustrates a data processor of an embodiment.

FIGS. 3A and 3B are each a flow chart illustrating a program to be executed by the arithmetic unit 111 of the data processor of one embodiment of the present invention described in Embodiment 1.

<Structural Example of Data Processor>

The data processor described in this embodiment is provided with the storage unit 112 that stores the program including the following steps.

In a first step, the first image data V1 is generated (51 in FIG. 3A). Note that a predetermined image or image data generated by another processing can be used.

In a second step, an interrupt processing is allowed (S2 in FIG. 3A). Note that when the interrupt processing is allowed, the arithmetic unit 111 can receive an instruction to execute the interrupt processing. Having received the instruction to execute the interrupt processing, the arithmetic unit 111 stops the main processing and executes the interrupt processing. For example, the arithmetic unit 111 that has received an event related to the instruction executes the interrupt processing and stores the execution result in the storage unit. Then, the arithmetic unit 111 that has returned from the interrupt processing can resume the main processing based on the execution result of the interrupt processing.

In a third step, the first image data V1 is displayed (S3 in FIG. 3A).

In a fourth step, a fifth step is selected when a termination instruction is supplied in the interrupt processing, and the third step is selected when no termination instruction is supplied in the interrupt processing (S4 in FIG. 3A).

In the fifth step, the program terminates (S5 in FIG. 3A).

The interrupt processing includes the following steps.

In a sixth step, a seventh step is selected when an instruction is supplied from the second positional data input portion 140(2), and an eighth step is selected when no instruction is supplied from the second positional data input portion 140(2) (T6 in FIG. 3B).

For example, the second positional data input portion 140(2) senses the position of a finger of the user of the data processor, which touches the second region 120(2) and supplies the second positional data L2. The arithmetic unit 111 can analyze the locus of the second positional data L2 and identify a variety of gestures (e.g., tap, drag, swipe, pinch-in, and pinch-out) of the user of the data processor using his/her finger as a pointer (for example, see FIG. 3C).

Specifically, the arithmetic unit 111 can relate, an instruction to sequentially select one image from a plurality of images to be displayed, to the tap or the like.

Furthermore, the arithmetic unit 111 can relate, an instruction to scroll and move a long band-like image, to the drag, swipe, or the like.

Furthermore, the arithmetic unit 111 can relate, an instruction to change the size of an image to be displayed, to the pinch-in, pinch-out, or the like.

In the seventh step, the first image data V1 is generated based on the instruction (T7 in FIG. 3B).

In the eighth step, the operation returns from the interrupt processing (T8 in FIG. 3B).

The data processor 100 described in this embodiment includes the step of generating the first image data V1 based on the second positional data L2. Thus, image data to be displayed on the first region can be determined with the use of the second positional data input portion. Consequently, a novel data processor can be provided.

<Modification Example of Data Processor>

Another structure of a data processor of one embodiment of the present invention will be described with reference to FIGS. 4A and 4B.

Figure 4A:
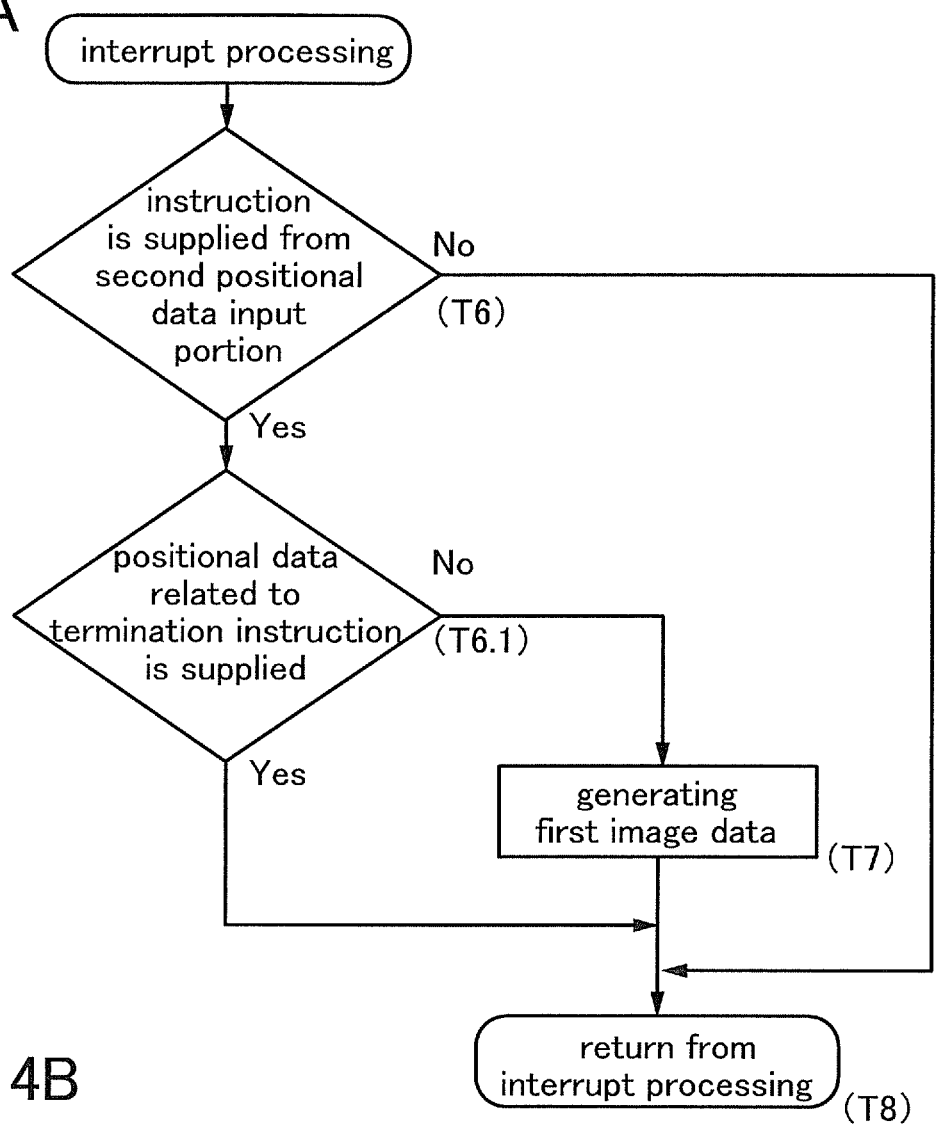
FIG. 4A is a flow chart illustrating an interrupt processing included in a program stored in a data processor of an embodiment.
Figure 4B:
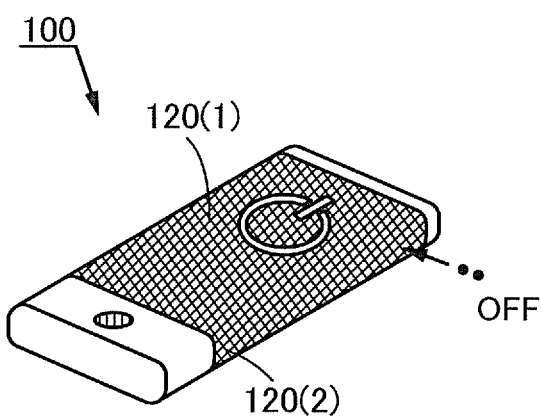
FIG. 4B illustrates a data processor of an embodiment.

FIG. 4A is a flow chart illustrating a modification example of the interrupt processing of the program described with reference to FIG. 3B.

The data processor described in this embodiment is provided with the storage unit 112 that stores a program including the following steps.

The data processor 100 described as a modification example in this embodiment is different from the data processor 100 described with reference to FIG. 3B in that, a step of selecting the eighth step when a termination instruction is supplied from the second positional data input portion 140(2) is included after the sixth step. Different structures will be described in detail below, and the above description is referred to for the other similar structures.

Note that in this specification, "termination instruction" refers to an instruction to terminate a program in processing; an instruction to stop the supply of a power supply potential to a power source of the data processor; an instruction to start a program, which includes a series of processing to be performed before stopping the supply of a power supply potential and a termination instruction thereof; and the like.

The data processor described in this embodiment is provided with the storage unit 112 that stores a program of an interrupt processing including the following steps.

In the sixth step, a step 6.1 is selected when an instruction is supplied from the second positional data input portion 140(2), and the eighth step is selected when no instruction is supplied from the second positional data input portion 140(2) (T6 in FIG. 4A).

In the step 6.1, the eighth step is selected when positional data related to a termination instruction is supplied from the second positional data input portion 140(2), and a seventh step is selected when no positional data related to a termination instruction is supplied from the second positional data input portion 140(2) (T6.1 in FIG. 4A).

For example, the second positional data input portion 140(2) senses the position of a finger of the user of the data processor, which touches the second region 120(2) and supplies the second positional data L2. The arithmetic unit 111 can analyze the locus of the second positional data L2 and identify a variety of gestures (e.g., tap, drag, swipe, pinch-in, and pinch-out) of the user of the data processor using his/her finger as a pointer.

Specifically, the arithmetic unit 111 can relate a termination instruction to a gesture of touching predetermined two points in the second positional data input portion 140(2) for a longer period than a predetermined period.

In the seventh step, the first image data V1 is generated based on the instruction (T7 in FIG. 4A).

In the eighth step, the operation returns from the interrupt processing (T8 in FIG. 4A).

The data processor described in this embodiment includes a step of returning from the interrupt processing and supplying the termination instruction when the positional data L2 supplied from the second positional data input portion 140(2) is related to the termination instruction. Thus, the termination instruction can be supplied with the use of the second region. Consequently, a novel data processor can be provided (see, for example, FIG. 4B).

This embodiment can be combined with any of the other embodiments in this specification as appropriate.

Embodiment 3

In this embodiment, a structure of a data processor of one embodiment of the present invention will be described with reference to FIGS. 5A to 5C and FIG. 6.

FIG. 5A is a flow chart illustrating a program to be executed by the arithmetic unit 111 of the data processor of one embodiment of the present invention described in Embodiment 1.

Figure 6:
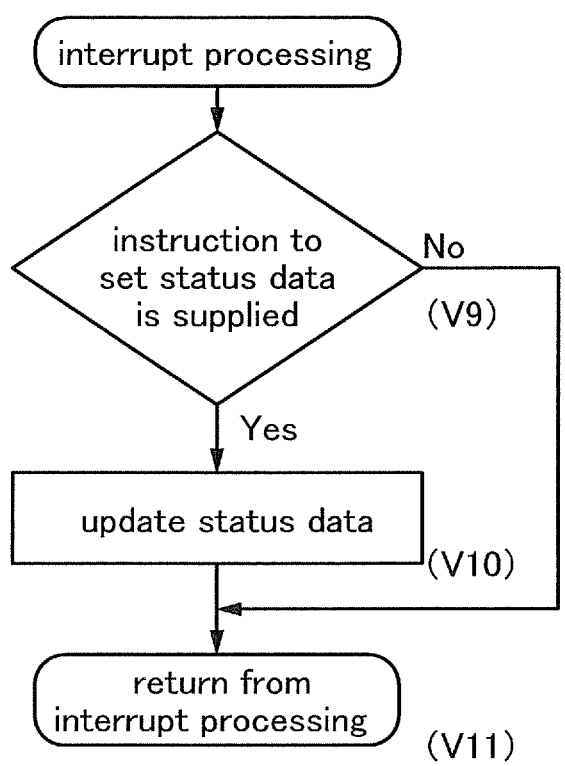
FIG. 6 is a flow chart illustrating an interrupt processing included in a program stored in a data processor of an embodiment.

FIG. 6 is a flow chart illustrating an interrupt processing of a program described with reference to FIG. 5A.

<Structural Example of Data Processor>

The data processor described in this embodiment is provided with the storage unit 112 that stores a program including the following steps.

In a first step, initial data including status data is acquired (U1 in FIG. 5A).

The status data is a sign that determines the operation of the data processor. The data processor performs a predetermined operation based on the status data.

For example, when the stats data shows a first status, the arithmetic unit 111 generates the first image data V1 and displays the first image data V1 on the first display portion 130(1).

When the status data shows a second status, the arithmetic unit 111 generates the second image data V2 and displays the second image data V2 on the second display portion 130(2).

In a second step, the interrupt processing is allowed (U2 in FIG. 5A).

In a third step, predetermined data is acquired (U3 in FIG. 5A).

For example, data to be displayed on the display portion is acquired.

In a fourth step, a fifth step is selected when the status data shows the first status and a sixth step is selected when the status data shows the second status (U4 in FIG. 5A).

For example, in a case where the first display portion 130(1) and the second display portion 130(2) are different in size, arrangement of data that is suitable for the first display portion 130(1) is not necessarily suitable for the second display portion 130(2). In that case, the display portion on which the data is displayed may be changed based on the status data. In addition, image data in which the data is arranged to be displayed suitably on the display portion may be generated.

Specifically, the first display portion 130(1) having a larger area than the second display portion 130(2) can display several lines of text at a time (for example, see FIG. 5B).

In contrast, a method in which one line is sequentially selected from several lines to be displayed or a method in which text is displayed in a flowing manner is preferred for the second display portion 130(2) having a narrow and long shape. In this way, the acquired predetermined data can be displayed using an appropriate size of characters (for example, see FIG. 5C).

In the fifth step, the first image data V1 is generated based on the acquired data, and the first image data V1 is displayed on the first display portion 130(1) (U5 in FIG. 5A).

In the sixth step, the second image data V2 is generated based on the acquired data, and the second image data V2 is displayed on the second display portion 130(2) (U6 in FIG. 5A).

In a seventh step, an eighth step is selected when a termination instruction is supplied in the interrupt processing and the third step is selected when no termination instruction is supplied in the interrupt processing (U7 in FIG. 5A).

In the eighth step, the program terminates (U8 in FIG. 5A).

The interrupt processing includes the following steps.

In a ninth step, a tenth step is selected when an instruction to set status data is supplied and an eleventh step is selected when no instruction to set status data is supplied (V9 in FIG. 6).

The user of the data processor can select and set as appropriate the status data that determines the operation of the data processor. Thus, the user can conveniently use the data processor.

Specifically, an instruction to set the status data to first status data is supplied in a case where the user wants a method in which the acquired data is displayed only on the first display portion.

Alternatively, an instruction to set the status data to second status data is supplied in a case where the user wants a method in which the acquired data is displayed only on the second display portion.

In the tenth step, the status data is updated based on the supplied instruction (V10 in FIG. 6).

In the eleventh step, the operation returns from the interrupt processing (V11 in FIG. 6).

The data processor described in this embodiment includes the step of acquiring predetermined data, the step of setting status data, and the step of generating image data including the acquired predetermined data based on the set status data and displaying the image data on the display portion. Thus, the image including the predetermined data can be displayed on a region that is set based on the status data. Consequently, a novel data processor can be provided.

This embodiment can be combined with any of the other embodiments in this specification as appropriate.

Embodiment 4

In this embodiment, a structure of a data processor of one embodiment of the present invention will be described with reference to FIGS. 7A and 7B and FIG. 8.

Figure 7A:
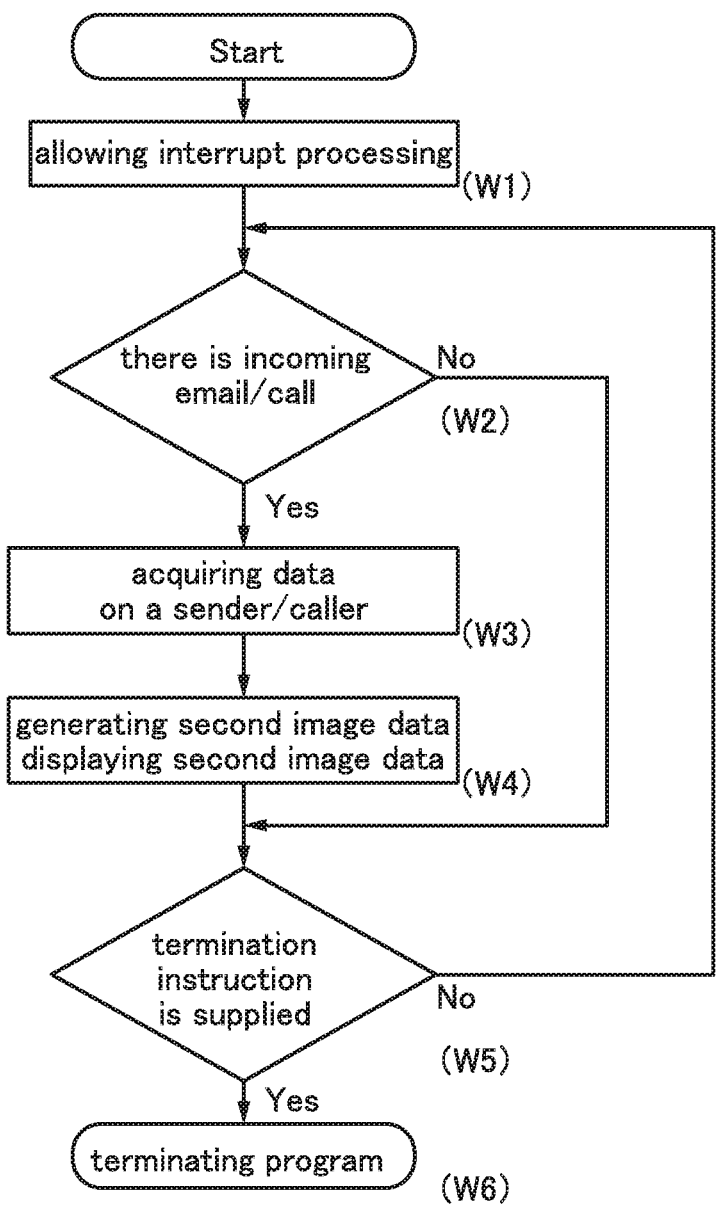
FIG. 7A is a flow chart illustrating a program stored in a data processor of an embodiment.

FIG. 7A is a flow chart illustrating a program to be executed by the arithmetic unit 111 of the data processor of one embodiment of the present invention described in Embodiment 1.

Figure 7B:
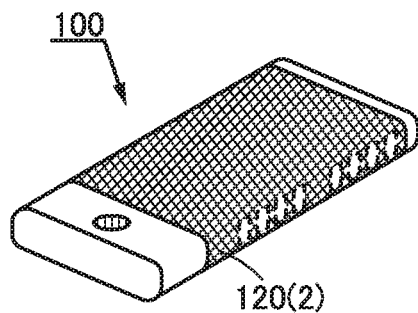
FIG. 7B illustrates a data processor of an embodiment.
Figure 8:
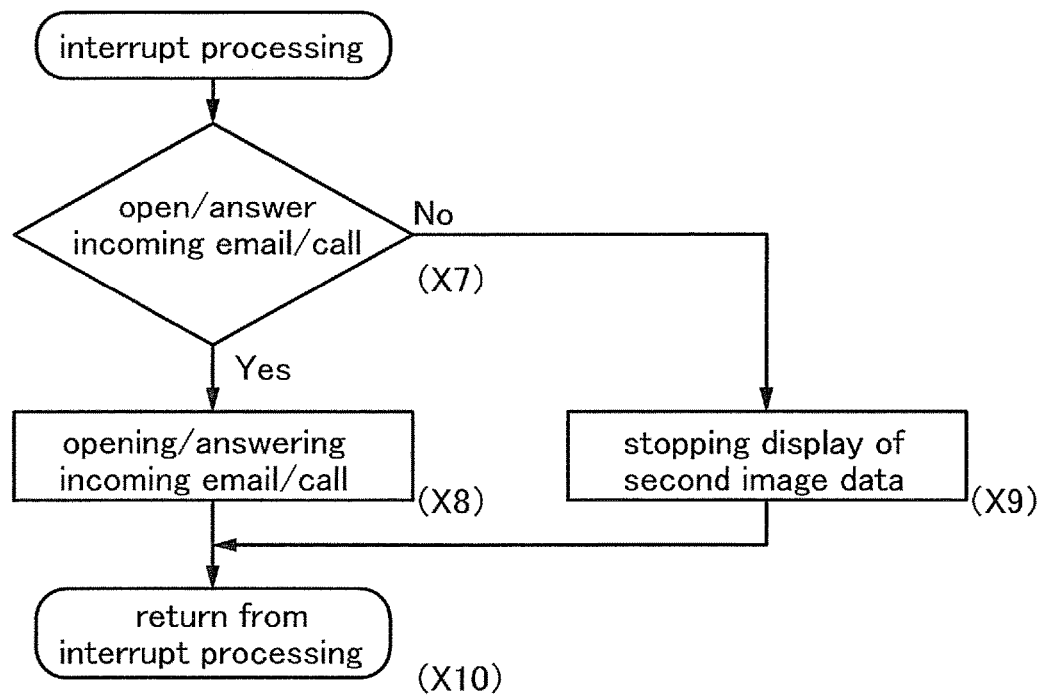
FIG. 8 is a flow chart illustrating an interrupt processing included in a program stored in a data processor of an embodiment.

FIG. 8 is a flow chart illustrating an interrupt processing of the program described with reference to FIGS. 7A and 7B.

<Structural Example of Data Processor>

The data processor described in this embodiment is provided with the storage unit 112 that stores the program including the following steps.

In a first step, an interrupt processing is allowed (W1 in FIG. 7A).

In a second step, a third step is selected when there is an incoming email/call, and a fifth step is selected when there is no incoming email/call (W2 in FIG. 7A).

For example, a data processor provided with the communication unit 160 that communicates data with a communication network can receive an email from the communication network. A data processor provided with the input/output unit 145 capable of outputting and inputting phonetic data, in addition to the communication unit, can receive a call.

In the third step, data on a sender/caller is acquired (W3 in FIG. 7A).

With the use of an email address/phone number of the sender/caller, an address book stored in the storage unit 112 is searched, so that data on the sender/caller can be acquired.

In a fourth step, the second image data including data on the sender/caller is generated, and the second image data is displayed (W4 in FIG. 7A).

In the fifth step, a sixth step is selected when a termination instruction is supplied in the interrupt processing and the second step is selected when no termination instruction is supplied in the interrupt processing (W5 in FIG. 7A).

In the sixth step, the program terminates (W6 in FIG. 7A).

The interrupt processing includes the following steps.

In a seventh step, an eighth step is selected in a case where the incoming email/call is to be opened/answered, and a ninth step is selected in a case where the incoming email/call is not to be opened/answered (X7 in FIG. 8).

In the eighth step, the incoming email/call is opened/answered (X8 in FIG. 8).

For example, an instruction to open/answer the incoming email/call can be supplied with the use of a switch or the like provided in the input/output unit 145 or a predetermined gesture from the positional data input portion 140.

Specifically, an application that enables reading and creating emails is started and the received email is read, or an application of telephone is started and phone talk is started.

In the ninth step, display of the second image data is stopped (X9 in FIG. 8).

For example, an instruction to reject the incoming email/call can be supplied with the use of a switch or the like provided in the input/output unit 145 or a predetermined gesture from the positional data input portion 140.

In a tenth step, the operation returns from the interrupt processing (X10 in FIG. 8).

The data processor of one embodiment of the present invention includes the step of displaying the phone number of the incoming call in its standby state and data related to the phone number on the second display portion (for example, see FIG. 7B). Thus, the phone number of the incoming call and data related thereto can be displayed. Consequently, a novel data processor can be provided.

This embodiment can be combined with any of the other embodiments in this specification as appropriate.

Embodiment 5

In this embodiment, a structure of a foldable/bendable touch panel that can be used for a display portion 130 and a positional data input portion 140 of a data processor of one embodiment of the present invention will be described with reference to FIGS. 9A to 9C.

Figure 9A:
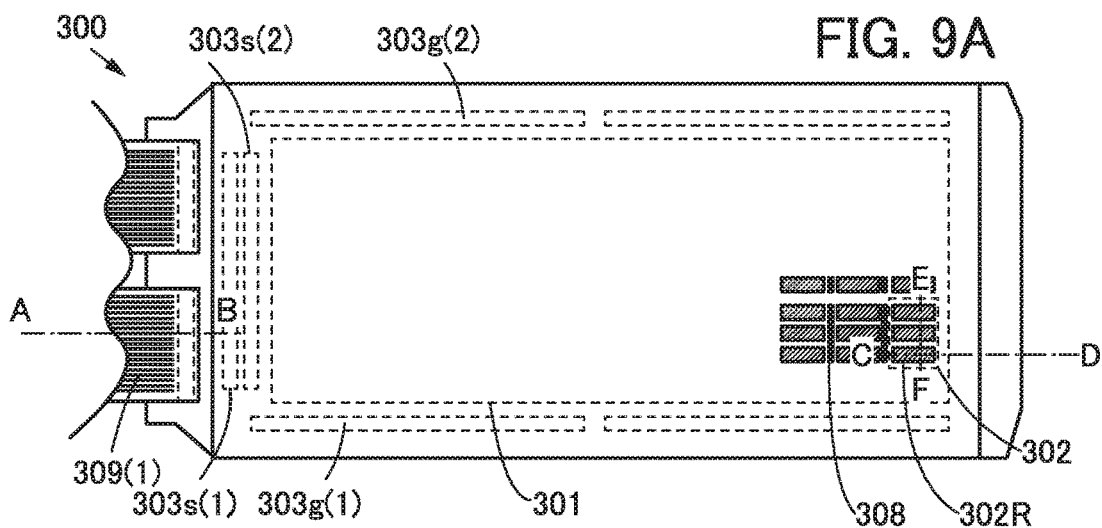
FIGS. 9A to 9C illustrate structures of a touch panel that can be used in a data processor of an embodiment.

FIG. 9A is a top view illustrating the structure of a touch panel that can be used in a data processor of one embodiment of the present invention.

Figure 9B:
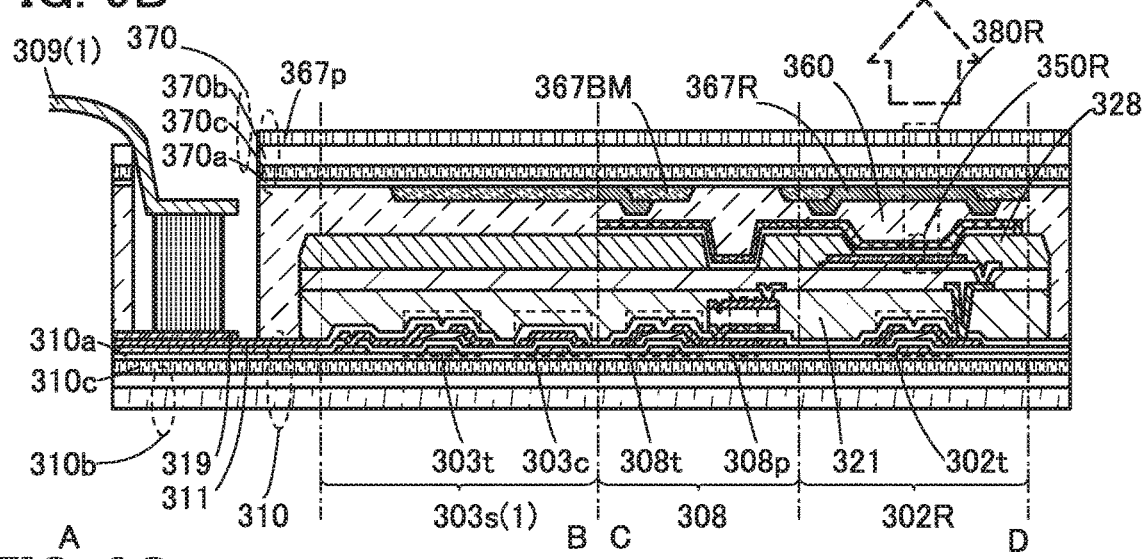

FIG. 9B is a cross-sectional view taken along line A-B and line C-D in FIG. 9A.

Figure 9C:
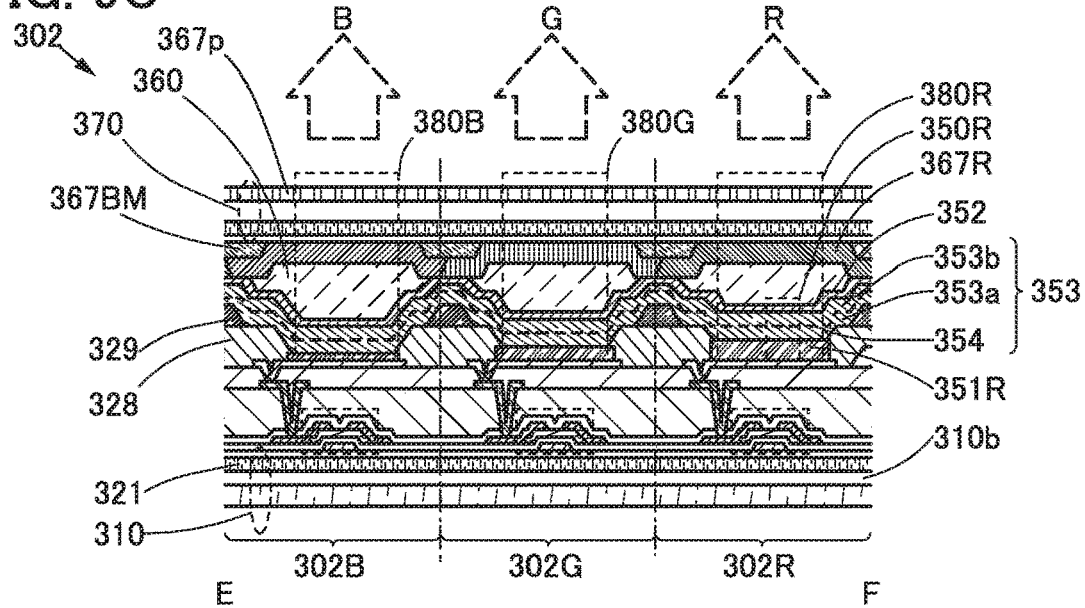

FIG. 9C is a cross-sectional view taken along line E-F in FIG. 9A.

<Top View>

A touch panel 300 described as an example in this embodiment includes a display portion 301 (see FIG. 9A).

The display portion 301 includes a plurality of pixels 302 and a plurality of imaging pixels 308. The imaging pixels 308 can sense a touch of a finger or the like on the display portion 301. Thus, a touch sensor can be formed using the imaging pixels 308.

Each of the pixels 302 includes a plurality of sub-pixels (e.g., a sub-pixel 302R). In addition, in the sub-pixels, light-emitting elements and pixel circuits that can supply electric power for driving the light-emitting elements are provided.

The pixel circuits are electrically connected to wirings through which selection signals are supplied and wirings through which image signals are supplied.

Furthermore, the touch panel 300 is provided with a scan line driver circuit 303g(1) that can supply selection signals to the pixels 302 and an image signal line driver circuit 303s(1) that can supply image signals to the pixels 302.

The imaging pixels 308 include photoelectric conversion elements and imaging pixel circuits that drive the photoelectric conversion elements.

The imaging pixel circuits are electrically connected to wirings through which control signals are supplied and wirings through which power supply potentials are supplied.

Examples of the control signals include a signal for selecting an imaging pixel circuit from which a recorded imaging signal is read, a signal for initializing an imaging pixel circuit, and a signal for determining the time it takes for an imaging pixel circuit to sense light.

The touch panel 300 is provided with an imaging pixel driver circuit 303g(2) that can supply control signals to the imaging pixels 308 and an imaging signal line driver circuit 303s(2) that reads out imaging signals.

<Cross-Sectional View>

The touch panel 300 includes a substrate 310 and a counter substrate 370 that faces the substrate 310 (see FIG. 9B).

The substrate 310 is a stacked body in which a flexible substrate 310b, a barrier film 310a that prevents diffusion of unintentional impurities to the light-emitting elements, and a resin layer 310c that attaches the barrier film 310a to the substrate 310b are stacked.

The counter substrate 370 is a stacked body in which a flexible substrate 370b, a barrier film 370a that prevents diffusion of unintentional impurities to the light-emitting elements, and a resin layer 370c that attaches the barrier film 370a to the substrate 370b are stacked (see FIG. 9B).

A sealant 360 attaches the counter substrate 370 to the substrate 310. The sealant 360 also serving as an optical adhesive layer has a refractive index higher than that of air. The pixel circuits and the light-emitting elements (e.g., a first light-emitting element 350R) are provided between the substrate 310 and the counter substrate 370.

<<Structure of Pixels>>

Each of the pixels 302 includes the sub-pixel 302R, a sub-pixel 302G, and a sub-pixel 302B (see FIG. 9C). The sub-pixel 302R includes a light-emitting module 380R, the sub-pixel 302G includes a light-emitting module 380G, and the sub-pixel 302B includes a light-emitting module 380B.

For example, the sub-pixel 302R includes the first light-emitting element 350R and the pixel circuit that can supply electric power to the first light-emitting element 350R and includes a transistor 302t (see FIG. 9B). Furthermore, the light-emitting module 380R includes the first light-emitting element 350R and an optical element (e.g., a first coloring layer 367R).

The first light-emitting element 350R includes a first lower electrode 351R, an upper electrode 352, and a layer 353 containing a light-emitting organic compound between the first lower electrode 351R and the upper electrode 352 (see FIG. 9C).

The layer 353 containing a light-emitting organic compound includes a light-emitting unit 353a, a light-emitting unit 353b, and an intermediate layer 354 between the light-emitting units 353a and 353b.

The light-emitting module 380R includes the first coloring layer 367R on the counter substrate 370. The coloring layer transmits light of a particular wavelength and is, for example, a layer that selectively transmits light of red, green, or blue color. A region that transmits light emitted from the light-emitting element as it is may be provided as well.

The light-emitting module 380R, for example, includes the sealant 360 that is in contact with the first light-emitting element 350R and the first coloring layer 367R.

The first coloring layer 367R is positioned in a region overlapping with the first light-emitting element 350R. Accordingly, part of light emitted from the first light-emitting element 350R passes through the sealant 360 that also serves as an optical adhesive layer and through the first coloring layer 367R and is emitted to the outside of the light-emitting module 380R as indicated by arrows in FIGS. 9B and 9C.

<<Structure of Display Panel>>

The touch panel 300 includes a light-blocking layer 367BM on the counter substrate 370. The light-blocking layer 367BM is provided so as to surround the coloring layer (e.g., the first coloring layer 367R).

The touch panel 300 includes an anti-reflective layer 367p positioned in a region overlapping with the display portion 301. As the anti-reflective layer 367p, a circular polarizing plate can be used, for example.

The touch panel 300 includes an insulating film 321. The insulating film 321 covers the transistor 302t. Note that the insulating film 321 can be used as a layer for planarizing unevenness caused by the pixel circuits. An insulating film on which a layer that can prevent diffusion of impurities to the transistor 302t and the like is stacked can be used as the insulating film 321.

The touch panel 300 includes the light-emitting elements (e.g., the first light-emitting element 350R) over the insulating film 321.

The touch panel 300 includes, over the insulating film 321, a partition wall 328 that overlaps with an end portion of the first lower electrode 351R (see FIG. 9C). In addition, a spacer 329 that controls the distance between the substrate 310 and the counter substrate 370 is provided on the partition wall 328.

<<Structure of Image Signal Line Driver Circuit>>

The image signal line driver circuit 303s(1) includes a transistor 303t and a capacitor 303c. Note that the driver circuit can be formed in the same process and over the same substrate as those of the pixel circuits.

<<Structure of Imaging Pixel>>

The imaging pixels 308 each include a photoelectric conversion element 308p and an imaging pixel circuit for sensing light received by the photoelectric conversion element 308p. The imaging pixel circuit includes a transistor 308t.

For example, a PIN photodiode can be used as the photoelectric conversion element 308p.

<<Other Components>>

The touch panel 300 includes a wiring 311 through which a signal can be supplied. The wiring 311 is provided with a terminal 319. Note that an FPC 309(1) through which a signal such as an image signal or a synchronization signal can be supplied is electrically connected to the terminal 319.

Note that a printed wiring board (PWB) may be attached to the FPC 309(1).

Transistors formed in the same process can be used as the transistor 302t, the transistor 303t, the transistor 308t, and the like.

Transistors of a bottom-gate type, a top-gate type, or the like can be used.

Any of various kinds of semiconductors can be used in the transistors. For example, an oxide semiconductor, single crystal silicon, polysilicon, amorphous silicon, or the like can be used.

This embodiment can be combined with any of the other embodiments in this specification as appropriate.

Embodiment 6

In this embodiment, a structure of a foldable/bendable touch panel that can be used in a data processor of one embodiment of the present invention will be described with reference to FIGS. 10A and 10B and FIGS. 11A to 11C.

Figure 10A:
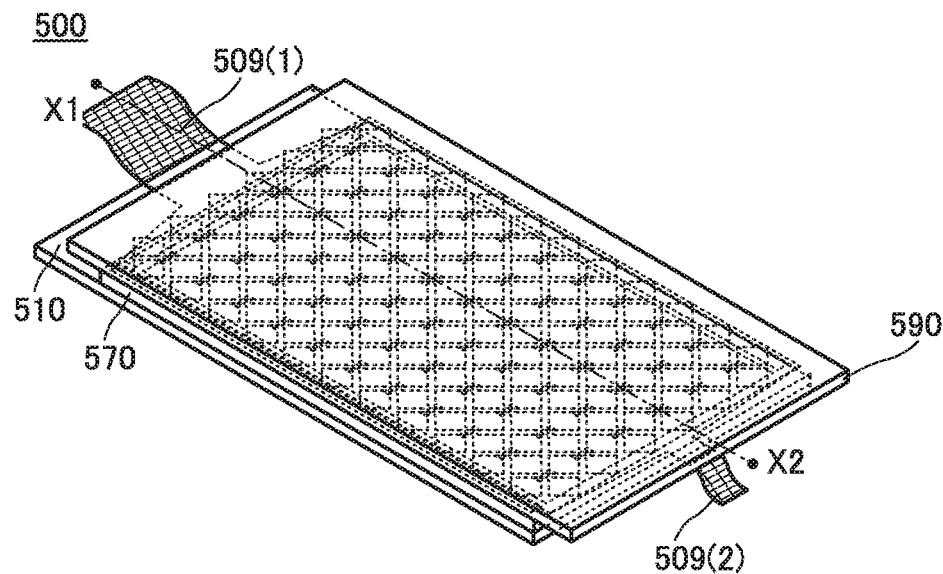
FIGS. 10A and 10B illustrate a structure of a touch panel that can be used in a data processor of an embodiment.
Figure 10B:
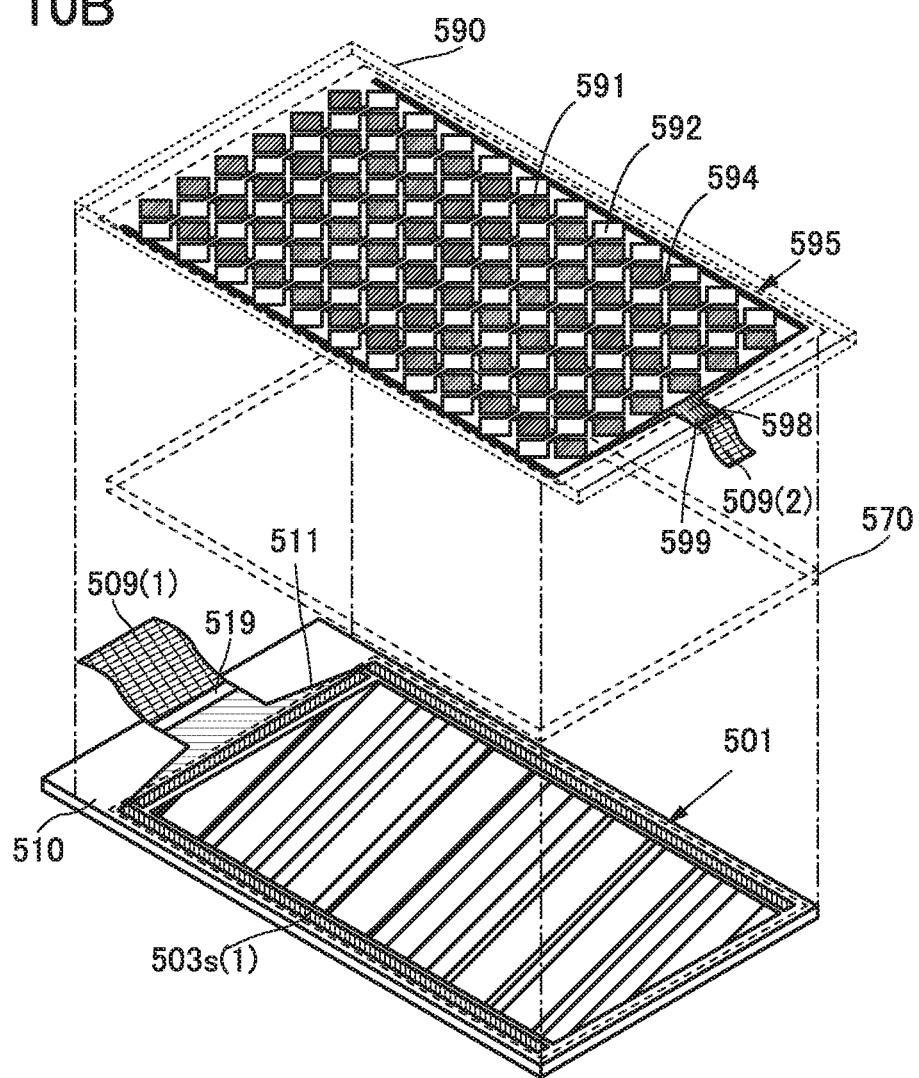

FIG. 10A is a perspective view of a touch panel 500 described as an example in this embodiment. Note that FIGS. 10A and 10B illustrate only main components for simplicity. FIG. 10B is a developed perspective view of the touch panel 500.

Figure 11A:
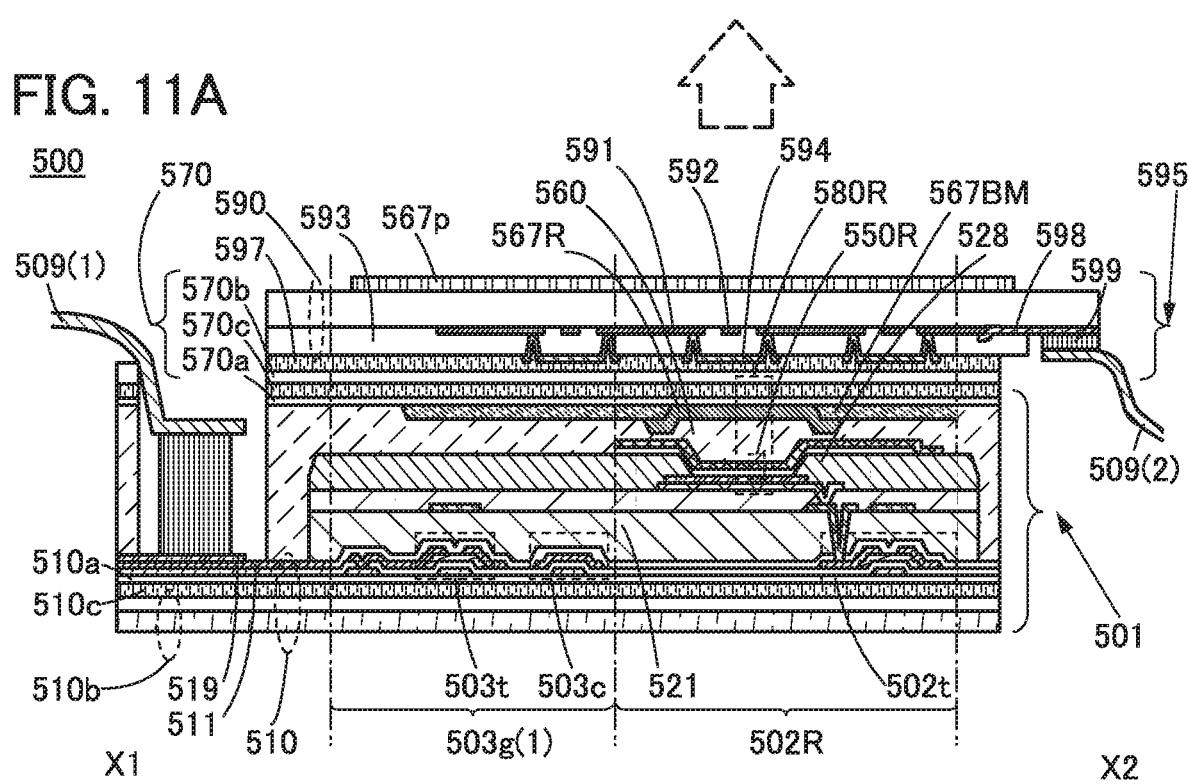
FIGS. 11A to 11C illustrate structures of a touch panel that can be used in a data processor of an embodiment.

FIG. 11A is a cross-sectional view of the touch panel 500 taken along line X1-X2 in FIG. 10A.

The touch panel 500 includes a display portion 501 and a touch sensor 595 (see FIG. 10B). Furthermore, the touch panel 500 includes a substrate 510, a substrate 570, and a substrate 590. Note that the substrate 510, the substrate 570, and the substrate 590 each have flexibility.

The display portion 501 includes the substrate 510, a plurality of pixels over the substrate 510, and a plurality of wirings 511 through which signals are supplied to the pixels. The plurality of wirings 511 is led to a peripheral portion of the substrate 510, and part of the plurality of wirings 511 forms a terminal 519. The terminal 519 is electrically connected to an FPC 509(1).

<Touch Sensor>

The substrate 590 includes the touch sensor 595 and a plurality of wirings 598 electrically connected to the touch sensor 595. The plurality of wirings 598 is led to a peripheral portion of the substrate 590, and part of the plurality of wirings 598 forms a terminal. The terminal is electrically connected to an FPC 509(2). Note that in FIG. 10B, electrodes, wirings, and the like of the touch sensor 595 provided on the back side of the substrate 590 (on the back side of the diagram) are indicated by solid lines for clarity.

As the touch sensor 595, a capacitive touch sensor can be used, for example. Examples of the capacitive touch sensor are a surface capacitive touch sensor and a projected capacitive touch sensor.

Examples of the projected capacitive touch sensor are a self-capacitive touch sensor and a mutual capacitive touch sensor, which differ mainly in the driving method. The use of a mutual capacitive touch sensor is preferable because multiple points can be sensed simultaneously.

An example of using a projected capacitive touch sensor will be described below with reference to FIG. 10B.

Note that a variety of sensors that can sense an approaching or contacting target, such as a finger, can be used.

The projected capacitive touch sensor 595 includes electrodes 591 and electrodes 592. The electrodes 591 are electrically connected to any of the plurality of wirings 598, and the electrodes 592 are electrically connected to any of the other wirings 598.

The electrodes 592 each have a shape of a plurality of quadrangles arranged in one direction with one corner of a quadrangle connected to one corner of another quadrangle as illustrated in FIGS. 10A and 10B.

The electrodes 591 each have a quadrangular shape and are arranged in a direction intersecting with the direction in which the electrodes 592 extend.

A wiring 594 electrically connects two electrodes 591 between which the electrode 592 is positioned. The intersecting area of the electrode 592 and the wiring 594 is preferably as small as possible. Such a structure allows a reduction in the area of a region where the electrodes are not provided, reducing unevenness in transmittance. As a result, unevenness in luminance of light passing through the touch sensor 595 can be reduced.

Note that the shapes of the electrodes 591 and the electrodes 592 are not limited to the above-mentioned shapes and can be any of a variety of shapes. For example, the plurality of electrodes 591 may be provided so that space between the electrodes 591 are reduced as much as possible, and a plurality of electrodes 592 may be provided with an insulating layer positioned between the electrodes 591 and the electrodes 592 and may be spaced apart from each other to form a region not overlapping with the electrodes 591. In that case, between two adjacent electrodes 592, it is preferable to provide a dummy electrode which is electrically insulated from these electrodes, whereby the area of a region having a different transmittance can be reduced.

The structure of the touch sensor 595 is described with reference to FIGS. 11A, 11B, and 11C.

The touch sensor 595 includes the substrate 590, the electrodes 591 and the electrodes 592 provided in a staggered arrangement on the substrate 590, an insulating layer 593 covering the electrodes 591 and the electrodes 592, and the wiring 594 that electrically connects the adjacent electrodes 591 to each other.

A resin layer 597 attaches the substrate 590 to the substrate 570 so that the touch sensor 595 overlaps with the display portion 501.

The electrodes 591 and the electrodes 592 are formed using a light-transmitting conductive material. As a light-transmitting conductive material, a conductive oxide such as indium oxide, indium tin oxide, indium zinc oxide, zinc oxide, or zinc oxide to which gallium is added can be used. A film containing graphene may be used as well. The film containing graphene can be formed, for example, by reducing a film containing graphene oxide. As a reducing method, a method with application of heat or the like can be employed.

The electrodes 591 and the electrodes 592 may be formed by depositing a light-transmitting conductive material on the substrate 590 by a sputtering method and then removing an unnecessary portion by any of various patterning techniques such as photolithography.

Examples of a material for the insulating layer 593 are a resin such as acrylic or epoxy resin, a resin having a siloxane bond, and an inorganic insulating material such as silicon oxide, silicon oxynitride, or aluminum oxide.

Furthermore, openings reaching the electrodes 591 are formed in the insulating layer 593, and the wiring 594 electrically connects the adjacent electrodes 591. A light-transmitting conductive material can be favorably used as the wiring 594 because the aperture ratio of the touch panel can be increased. Moreover, a material with higher conductivity than the conductivities of the electrodes 591 and 592 can be favorably used as the wiring 594 because electric resistance can be reduced.

One electrode 592 extends in one direction, and a plurality of electrodes 592 is provided in the form of stripes.

The wiring 594 intersects with the electrode 592.

Adjacent electrodes 591 are provided with one electrode 592 provided therebetween. The wiring 594 electrically connects the adjacent electrodes 591.

Note that the plurality of electrodes 591 is not necessarily arranged in the direction orthogonal to one electrode 592 and may be arranged to intersect with one electrode 592 at an angle of less than 90 degrees.

One wiring 598 is electrically connected to any of the electrodes 591 and 592. Part of the wiring 598 serves as a terminal. For the wiring 598, a metal material such as aluminum, gold, platinum, silver, nickel, titanium, tungsten, chromium, molybdenum, iron, cobalt, copper, or palladium or an alloy material containing any of these metal materials can be used.

Note that an insulating layer that covers the insulating layer 593 and the wiring 594 may be provided to protect the touch sensor 595.

Furthermore, a connection layer 599 electrically connects the wiring 598 to the FPC 509(2).

As the connection layer 599, any of various anisotropic conductive films (ACF), anisotropic conductive pastes (ACP), or the like can be used.

The resin layer 597 has a light-transmitting property. For example, a thermosetting resin or an ultraviolet curable resin can be used; specifically, a resin such as an acrylic resin, an urethane resin, an epoxy resin, or a resin having a siloxane bond can be used.

<Display Portion>

The display portion 501 includes a plurality of pixels arranged in a matrix. Each of the pixels includes a display element and a pixel circuit for driving the display element.

In this embodiment, an example of using an organic electroluminescent element that emits white light as a display element will be described; however, the display element is not limited to such element.

For example, organic electroluminescent elements that emit light of different colors may be included in sub-pixels so that the light of different colors can be emitted from the respective sub-pixels.

Other than organic electroluminescent elements, any of various display elements such as display elements (electronic ink) that perform display by an electrophoretic method, an electronic liquid powder method, an electrowetting method, or the like; MEMS shutter display elements; optical interference type MEMS display elements; and liquid crystal elements can be used. Furthermore, this embodiment can be used in a transmissive liquid crystal display, a transflective liquid crystal display, a reflective liquid crystal display, a direct-view liquid crystal display, or the like. A structure suitable for employed display elements can be selected from among a variety of structures of pixel circuits.

In the display portion, an active matrix method in which an active element is included in a pixel or a passive matrix method in which an active element is not included in a pixel can be used.

In an active matrix method, as an active element (a non-linear element), not only a transistor but also various active elements (non-linear elements) can be used. For example, a metal insulator metal (MIM), a thin film diode (TFD), or the like can also be used. Since such an element has few numbers of manufacturing steps, manufacturing cost can be reduced or yield can be improved. Alternatively, since the size of the element is small, the aperture ratio can be improved, so that power consumption can be reduced or higher luminance can be achieved.

As a method other than the active matrix method, the passive matrix method in which an active element (a non-linear element) is not used can also be used. Since an active element (a non-linear element) is not used, the number of manufacturing steps is small, so that manufacturing cost can be reduced or yield can be improved. Alternatively, since an active element (a non-linear element) is not used, the aperture ratio can be improved, so that power consumption can be reduced or higher luminance can be achieved, for example.

Flexible materials can be favorably used in the substrate 510 and the substrate 570.

Materials with which unintended passage of impurities is inhibited can be favorably used in the substrate 510 and the substrate 570. For example, materials with a vapor permeability of lower than or equal to $10^{-5}$ g/m²·day, preferably lower than or equal to $10^{-6}$ g/m²·day can be favorably used.

The substrate 510 can be favorably formed using a material whose coefficient of linear expansion is substantially equal to that of the substrate 570. For example, the coefficient of linear expansion of the materials are preferably lower than or equal to $1\times10^{-3}$/K, further preferably lower than or equal to $5\times10^{-5}$/K, and still further preferably lower than or equal to $1\times10^{-5}$/K.

The substrate 510 is a stacked body in which a flexible substrate 510b, a barrier film 510a that prevents diffusion of unintentional impurities to light-emitting elements, and a resin layer 510c that attaches the barrier film 510a to the substrate 510b are stacked.

For example, materials that include polyester, polyolefin, polyamide (e.g., nylon, aramid), polyimide, polycarbonate, or a resin having an acrylic bond, an urethane bond, an epoxy bond, or a siloxane bond can be used for the resin layer 510c.

The substrate 570 is a stacked body in which a flexible substrate 570b, a barrier film 570a that prevents diffusion of unintentional impurities to the light-emitting elements, and a resin layer 570c that attaches the barrier film 570a to the substrate 570b are stacked.

A sealant 560 attaches the substrate 570 to the substrate 510. The sealant 560 has a refractive index higher than that of air. In a case where light is extracted to the sealant 560 side, the sealant 560 serves as an optical adhesive layer. The pixel circuits and the light-emitting elements (e.g., a first light-emitting element 550R) are provided between the substrate 510 and the substrate 570.

<<Structure of Pixel>>

A pixel includes a sub-pixel 502R, and the sub-pixel 502R includes a light-emitting module 580R.

The sub-pixel 502R includes the first light-emitting element 550R and the pixel circuit, which can supply electric power to the first light-emitting element 550R and includes a transistor 502t. Furthermore, the light-emitting module 580R includes the first light-emitting element 550R and an optical element (e.g., a first coloring layer 567R).

The first light-emitting element 550R includes a lower electrode, an upper electrode, and a layer containing a light-emitting organic compound between the lower electrode and the upper electrode.

The light-emitting module 580R includes the first coloring layer 567R on the light extraction side. The coloring layer transmits light of a particular wavelength and is, for example, a layer that selectively transmits light of red, green, or blue color. Note that in another sub-pixel, a region that transmits light emitted from the light-emitting element as it is may be provided as well.

In a case where the sealant 560 is provided on the light extraction side, the sealant 560 is in contact with the first light-emitting element 550R and the first coloring layer 567R.

The first coloring layer 567R is positioned in a region overlapping with the first light-emitting element 550R. Accordingly, part of light emitted from the first light-emitting element 550R passes through the first coloring layer 567R and is emitted to the outside of the light-emitting module 580R as indicated by an arrow in FIG. 11A.

<<Structure of Display Portion>>

The display portion 501 includes a light-blocking layer 567BM on the light extraction side. The light-blocking layer 567BM is provided so as to surround the coloring layer (e.g., the first coloring layer 567R).

The display portion 501 includes an anti-reflective layer 567p positioned in a region overlapping with pixels. As the anti-reflective layer 567p, a circular polarizing plate can be used, for example.

The display portion 501 includes an insulating film 521. The insulating film 521 covers the transistor 502t. Note that the insulating film 521 can be used as a layer for planarizing unevenness caused by the pixel circuit. A stacked film including a layer that can prevent diffusion of impurities can be used as the insulating film 521. This can prevent the reliability of the transistor 502t or the like from being lowered by diffusion of unintentional impurities.

The display portion 501 includes the light-emitting elements (e.g., the first light-emitting element 550R) over the insulating film 521.

The display portion 501 includes, over the insulating film 521, a partition wall 528 that overlaps with an end portion of the first lower electrode. In addition, a spacer that controls the distance between the substrate 510 and the substrate 570 is provided on the partition wall 528.

<<Structure of Scan Line Driver Circuit>>

A scan line driver circuit 503g(1) includes a transistor 503t and a capacitor 503c. Note that the driver circuit can be formed in the same process and over the same substrate as those of the pixel circuits.

<<Other Components>>

The display portion 501 includes the wirings 511 through which signals can be supplied. The wirings 511 are provided with the terminal 519. Note that the FPC 509(1) through which a signal such as an image signal or a synchronization signal can be supplied is electrically connected to the terminal 519.

Note that a printed wiring board (PWB) may be attached to the FPC 509(1).

The display portion 501 includes wirings such as scan lines, signal lines, and power supply lines. Any of various conductive films can be used as the wirings.

Specifically, a metal element selected from aluminum, chromium, copper, tantalum, titanium, molybdenum, tungsten, nickel, yttrium, zirconium, silver, and manganese; an alloy including any of the above-described metal elements; an alloy including any of the above-described metal elements in combination; or the like can be used. In particular, one or more elements selected from aluminum, chromium, copper, tantalum, titanium, molybdenum, and tungsten are preferably included. In particular, an alloy of copper and manganese is suitably used in microfabrication with the use of a wet etching method.

Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, or the like can be used.

Specifically, a stacked structure in which a film of an element selected from titanium, tantalum, tungsten, molybdenum, chromium, neodymium, and scandium, an alloy film including some of these elements, or a conductive nitride film is stacked over an aluminum film can be used.

Alternatively, a light-transmitting conductive material including indium oxide, tin oxide, or zinc oxide may be used.

Modification Example 1 of Display Portion

Any of various kinds of transistors can be used in the display portion 501.

Figure 11B:
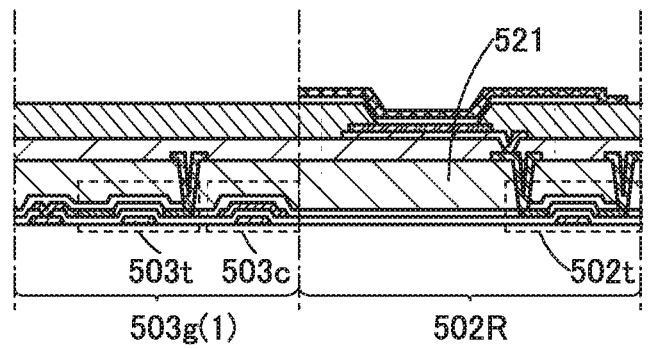

A structure in which bottom-gate transistors are used in the display portion 501 is illustrated in FIGS. 11A and 11B.

For example, a semiconductor layer containing an oxide semiconductor, amorphous silicon, or the like can be used in the transistor 502t and the transistor 503t shown in FIG. 11A.

For example, a film represented by an In-M-Zn oxide that contains at least indium (In), zinc (Zn), and M (M is a metal such as Al, Ga, Ge, Y, Zr, Sn, La, Ce, or Hf) is preferably included. Alternatively, both In and Zn are preferably contained.

As a stabilizer, gallium (Ga), tin (Sn), hafnium (Hf), aluminum (Al), zirconium (Zr), or the like can be given. As another stabilizer, lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) can be given.

As an oxide semiconductor included in an oxide semiconductor film, any of the following can be used, for example: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, an In—Hf—Al—Zn-based oxide, and an In—Ga-based oxide.

Note that here, for example, an "In—Ga—Zn-based oxide" means an oxide containing In, Ga, and Zn as its main components and there is no limitation on the ratio of In:Ga:Zn. The In—Ga—Zn-based oxide may contain another metal element in addition to In, Ga, and Zn.

For example, a semiconductor layer containing polycrystalline silicon that is obtained by crystallization process such as laser annealing can be used in the transistor 502t and the transistor 503t shown in FIG. 11B.

Figure 11C:
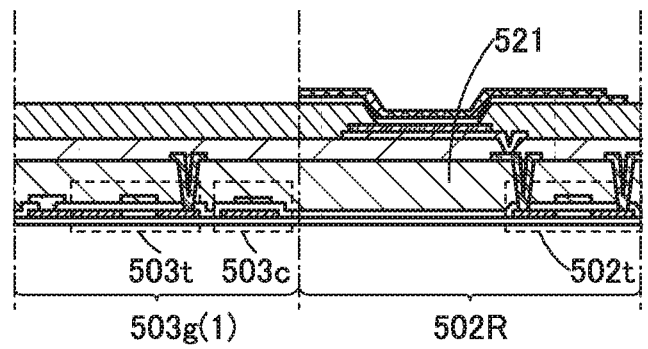

A structure in which top-gate transistors are used in the display portion 501 is shown in FIG. 11C.

For example, a semiconductor layer including polycrystalline silicon, a single crystal silicon film that is transferred from a single crystal silicon substrate, or the like can be used in the transistor 502t and the transistor 503t shown in FIG. 11C.

This embodiment can be combined with any of the other embodiments in this specification as appropriate.

Embodiment 7

In this embodiment, a structure of a foldable/bendable touch panel that can be used in a data processor of one embodiment of the present invention will be described with reference to FIGS. 12A to 12C.

Figure 12A:
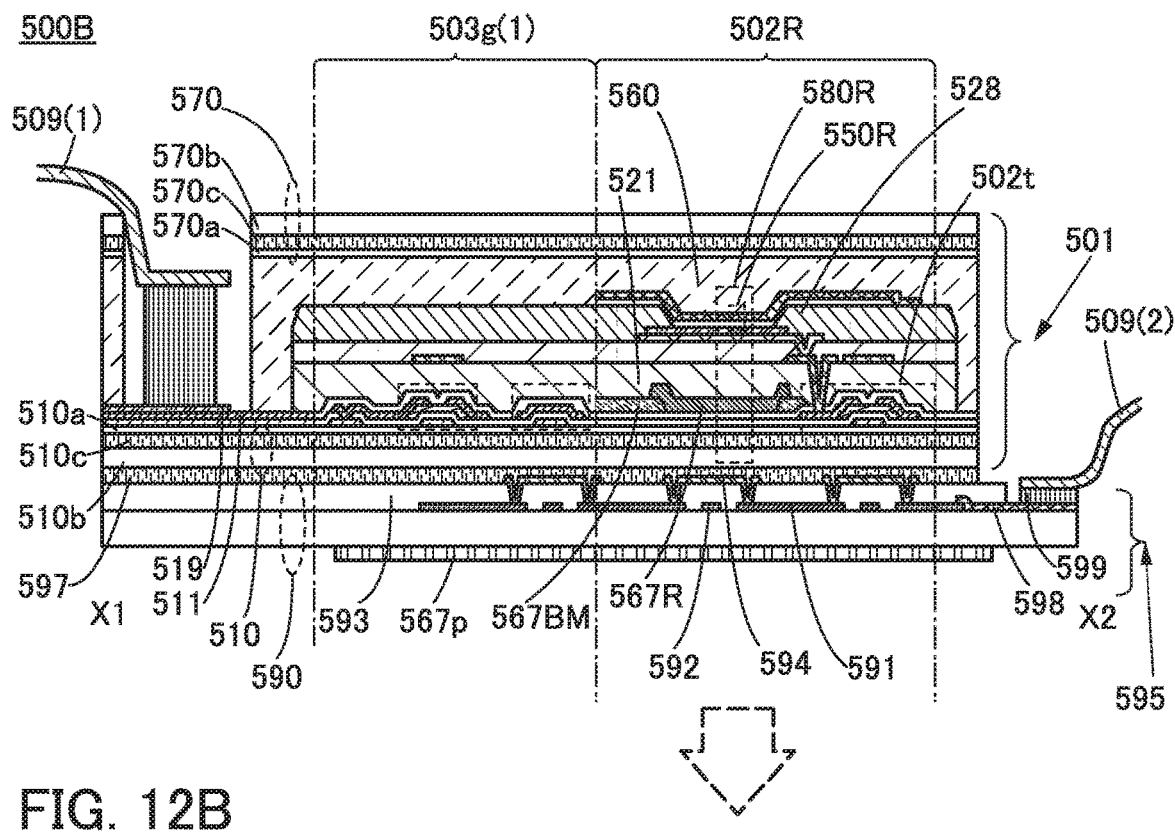
FIGS. 12A to 12C illustrate structures of a touch panel that can be used in a data processor of an embodiment.
Figure 12B:
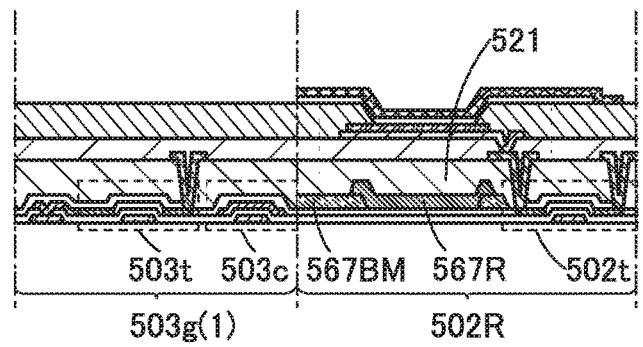
Figure 12C:
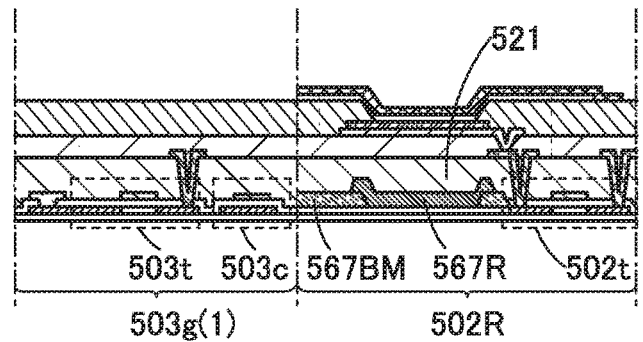

FIGS. 12A to 12C are cross-sectional views illustrating a structure of a touch panel 500B taken along line X1-X2 in FIG. 10A.

The touch panel 500B described in this embodiment is different from the touch panel 500 described in Embodiment 6 in that the display portion 501 displays received image data on the side where the transistors are provided and that the touch sensor is provided on the substrate 510 side of the display portion. Different structures will be described in detail below, and the above description is referred to for the other similar structures.

<Display Portion>

The display portion 501 includes a plurality of pixels arranged in a matrix. Each of the pixels includes a display element and a pixel circuit for driving the display element.

<<Structure of Pixel>>

A pixel includes a sub-pixel 502R, and the sub-pixel 502R includes a light-emitting module 580R.

The sub-pixel 502R includes the first light-emitting element 550R and the pixel circuit, which can supply electric power to the first light-emitting element 550R and includes a transistor 502t.

Furthermore, the light-emitting module 580R includes the first light-emitting element 550R and an optical element (e.g., a first coloring layer 567R).

The first light-emitting element 550R includes a lower electrode, an upper electrode, and a layer containing a light-emitting organic compound between the lower electrode and the upper electrode.

The light-emitting module 580R includes the first coloring layer 567R on the light extraction side. The coloring layer transmits light of a particular wavelength and is, for example, a layer that selectively transmits light of red, green, or blue color. Note that in another sub-pixel, a region that transmits light emitted from the light-emitting element as it is may be provided as well.

The first coloring layer 567R is positioned in a region overlapping with the first light-emitting element 550R. The first light-emitting element 550R shown in FIG. 12A emits light to the side where the transistor 502t is provided. Accordingly, part of light emitted from the first light-emitting element 550R passes through the first coloring layer 567R and is emitted to the outside of the light-emitting module 580R as indicated by an arrow in FIG. 12A.

<<Structure of Display Portion>>

The display portion 501 includes a light-blocking layer 567BM on the light extraction side. The light-blocking layer 567BM is provided so as to surround the coloring layer (e.g., the first coloring layer 567R).

The display portion 501 includes an insulating film 521. The insulating film 521 covers the transistor 502t. Note that the insulating film 521 can be used as a layer for planarizing unevenness caused by the pixel circuit. A stacked film including a layer that can prevent diffusion of impurities can be used as the insulating film 521. This can prevent reliability of the transistor 502t or the like from being lowered by diffusion of unintentional impurities from the first coloring layer 567R.

<Touch Sensor>

The touch sensor 595 is provided on the substrate 510 side of the display portion 501 (see FIG. 12A).

The resin layer 597 is provided between the substrate 510 and the substrate 590 and attaches the touch sensor 595 to the display portion 501.

Modification Example 1 of Display Portion

Any of various kinds of transistors can be used in the display portion 501.

A structure in which bottom-gate transistors are used in the display portion 501 is illustrated in FIGS. 12A and 12B.

For example, a semiconductor layer containing an oxide semiconductor, amorphous silicon, or the like can be used in the transistor 502t and the transistor 503t shown in FIG. 12A. In the transistors, a channel formation region may be sandwiched between upper and lower gate electrodes, in which case variations in characteristics of the transistors can be prevented and thus the reliability can be increased.

For example, a semiconductor layer containing polycrystalline silicon or the like can be used in the transistor 502t and the transistor 503t shown in FIG. 12B.

A structure in which top-gate transistors are used in the display portion 501 is shown in FIG. 12C.

For example, a semiconductor layer including polycrystalline silicon, a transferred single crystal silicon film, or the like can be used in the transistor 502t and the transistor 503t shown in FIG. 12C.

This embodiment can be combined with any of the other embodiments in this specification as appropriate.

Embodiment 8

In this embodiment, a data processor of one embodiment of the present invention will be described with reference to FIGS. 13A1, 13A2, 13A3, 13B1, 13B2, 13C1, and 13C2.

FIGS. 13A1, 13A2, 13A3, 13B1, 13B2, 13C1, and 13C2 illustrate data processors of one embodiment of the present invention.

Specifically, FIG. 13A1 is a perspective view showing the outward form of a portable data processor 1300A, FIG. 13A2 is a top view of the portable data processor 1300A, and FIG. 13A3 illustrates a usage state of the portable data processor 1300A.

FIGS. 13B1 and 13B2 are perspective views showing the outward form of a data processor 1300B.

FIGS. 13C1 and 13C2 are perspective views showing the outward form of a data processor 1300C.

<Portable Data Processor>

The portable data processor 1300A serves as one or more of a telephone set, an email creating and reading device, a notebook, a data browsing device, and the like, for example. Specifically, the portable data processor 1300A can be used as a cell phone or a smartphone.

An input/output device is provided along a plurality of sides of a housing. For example, the input/output device having flexibility is placed along the inner sides of the housing. With this structure, character information, image information, and the like can be displayed on a first region 120(1) and/or a second region 120(2).

For example, images used for three operations can be displayed on the first region 120(1) (see FIG. 13A1). Furthermore, character information and the like can be displayed on the second region 120(2) as indicated by dashed rectangles in the drawing (see FIG. 13A2).

In a case where the second region 120(2) is on the upper portion of the portable data processor 1300A, a user can easily see character or image information displayed on the second region 120(2) of the portable data processor 1300A while the portable data processor 1300A is placed in a breast pocket of the user's clothes (see FIG. 13A3). For example, the user can see the phone number, name, and the like of the caller of an incoming call, from above the portable data processor 1300A.

Note that the portable data processor 1300A can be provided with a vibration sensor or the like and a memory device that stores a program for shifting a mode into an incoming call rejection mode based on vibration sensed by the vibration sensor or the like. Thus, the user can shift the mode into the incoming call rejection mode by tapping the portable data processor 1300A over his/her clothes to apply vibration.

<Data Processor>

The data processor 1300B includes an input/output unit having a first region 120(1) and a second region 120(2), and a housing 101 that supports the input/output unit.

The housing has a plurality of bend portions, and the longest bend portion in the housing is between the first region 120(1) and the second region 120(2).

The data processor 1300B can be used with the second region 120(2) provided along the longest bend portion facing sideward.

<Data Processor>

The data processor 1300C includes an input/output unit having a first region 120(1) and a second region 120(2), and a housing 101 that supports the input/output unit.

The housing has a plurality of bend portions, and the second longest bend portion in the housing is between the first region 120(1) and the second region 120(2).

The data processor 1300C can be used with the second region 120(2) facing upward.

This embodiment can be combined with any of the other embodiments in this specification as appropriate.

EXPLANATION OF REFERENCE

100: data processor, 101: housing, 110: arithmetic device, 111: arithmetic unit, 112: storage unit, 114: transmission path, 115: input/output interface, 120(3): bend portion, 120: input/output device, 120(1): first region, 120(2): second region, 130: display portion, 130(1): first display portion, 130(2): second display portion, 140: positional data input portion: 140(1): first positional data input portion, 140(2): second positional data input portion, 141: substrate, 142: proximity sensor, 145: input/output unit, 150: sensor unit, 160: communication unit, 300: touch panel, 301: display portion, 302: pixel, 302B: sub-pixel, 302G: sub-pixel, 302R: sub-pixel, 302t: transistor, 303c: capacitor, 303g(1): scan line driver circuit, 303g(2): imaging pixel driver circuit, 303s(1): image signal line driver circuit, 303s(2) imaging signal line driver circuit, 303t: transistor, 308: imaging pixel, 308p: photoelectric conversion element, 308t: transistor, 309: FPC, 310: substrate, 310a: barrier film, 310b: substrate, 310c: resin layer, 311: wiring, 319: terminal, 321: insulating film, 328: partition wall, 329: spacer, 350R: light-emitting element, 351R: lower electrode, 352: upper electrode, 353: layer, 353a: light-emitting unit, 353b: light-emitting unit, 354: intermediate layer, 360: sealant, 367BM: light-blocking layer, 367p: anti-reflective layer, 367R: coloring layer, 370: counter substrate, 370a: barrier film, 370b: substrate, 370c: resin layer, 380B: light-emitting module, 380G: light-emitting module, 380R: light-emitting module, 500: touch penal, 500B: touch panel, 501: display portion, 502R: sub-pixel, 502t: transistor, 503c: capacitor, 503g: scan line driver circuit, 503t: transistor, 509: FPC, 510: substrate, 510a: barrier film, 510b: substrate, 510c: resin layer, 511: wiring, 519: terminal, 521, insulating film, 528: partition wall, 550R: light-emitting element, 560: sealant, 567BM: light-blocking layer, 567p: anti-reflective layer, 567R: coloring layer, 570: substrate, 570a: barrier film, 570b: substrate, 570c: resin layer, 580R: light-emitting module, 590: substrate, 591: electrode, 592: electrode, 593: insulating layer, 594: wiring, 595: touch sensor, 597: resin layer, 598: wiring, 599: connection layer, 1300A: portable data processor, 1300B: data processor, 1300C: data processor.

This application is based on Japanese Patent Application serial no. 2013-237254 filed with Japan Patent Office on Nov. 15, 2013, the entire contents of which are hereby incorporated by reference.

The invention claimed is:

1. A data processor comprising:
   a housing having a first face, a second face being adjacent to the first face, and a third face adjacent to the second face and facing the first face;
   an input/output device including a pixel portion, a driver circuit portion, and a terminal portion provided over a flexible substrate, the input/output device comprising a first region on the first face of the housing, a second region on the second face and a first part of the third face of the housing, and a first bending part between the first region and the second region; and
   an arithmetic device including an arithmetic unit and a storage unit, the arithmetic device provided on a second part of the third face of the housing,
   wherein the first region comprises a first display portion and a first positional data input portion overlapped with each other,
   wherein the second region comprises a second display portion and a second positional data input portion overlapped with each other,
   wherein the first positional data input portion is configured to supply first positional data to the arithmetic device,
   wherein the second positional data input portion is configured to supply second positional data to the arithmetic device, and
   wherein the arithmetic device is configured to supply first image data to the first display portion and second image data to the second display portion.

2. The data processor according to claim 1, wherein each of the first display portion and the second display portion comprises a transistor in which a channel formation region comprises oxide semiconductor.

3. The data processor according to claim 1,
   wherein the input/output device further includes an FPC connected to the terminal portion, and
   wherein the terminal portion is provided in the first region.

4. The data processor according to claim 1,
   wherein the storage unit is configured to store a program to be executed by the arithmetic unit,
   wherein the program comprises:
      a first step of allowing an interrupt processing;
      a second step of selecting a third step when the second positional data is supplied or selecting a fourth step when the second positional data is not supplied;
      the third step of generating the first image data based on the second positional data;
      the fourth step of returning from the interrupt processing;
      a fifth step of displaying the first image data on the first display portion;
      a sixth step of selecting a seventh step when a termination instruction is supplied or selecting the fifth step when no termination instruction is supplied; and
      the seventh step of terminating the program, and
   wherein driving of the second positional data input portion is stopped during at least the fifth step.

5. The data processor according to claim 4, wherein the termination instruction is supplied from the second positional data input portion.

6. The data processor according to claim 1, wherein driving of the second positional data input portion is configured to be stopped when the housing is held by user's hand and the second face of the housing is covered with the user's hand.

7. The data processor according to claim 1,
   wherein the storage unit is configured to store a program to be executed by the arithmetic unit, and
   wherein the program comprises:
      a first step of acquiring initial data including status data;
      a second step of allowing an interrupt processing;
      a third step of acquiring predetermined data;
      a fourth step of selecting a fifth step when the status data shows a first status or selecting a sixth step when the status data shows a second status;
      the fifth step of generating the first image data based on the predetermined data and displaying the first image data on the first display portion;
      the sixth step of generating the second image data based on the predetermined data and displaying the second image data on the second display portion;
      a seventh step of selecting an eighth step when a termination instruction is supplied in the interrupt processing or selecting the third step when no termination instruction is supplied in the interrupt processing; and
      the eighth step of terminating the program, and
   wherein driving of the second positional data input portion is stopped during at least the fifth step.

8. The data processor according to claim 7,
   wherein the interrupt processing comprises:
      a ninth step of selecting a tenth step when an instruction to set the status data is supplied or selecting an eleventh step when no instruction to set the status data is supplied;
      the tenth step of updating the status data based on the supplied instruction; and
      the eleventh step of returning from the interrupt processing.

9. A data processor comprising:
   a housing having a first face, a second face being adjacent to the first face, and a third face adjacent to the second face and facing the first face;
   an input/output device including a pixel portion, a driver circuit portion, and a terminal portion provided over a flexible substrate, the input/output device comprising a first region on the first face of the housing, a second region on the second face of the housing, a first bending part between the first region and the second region, a third region on a first part of the third face of the housing, a second bending part between the second region and the third region; and
   an arithmetic device including an arithmetic unit and a storage unit, the arithmetic device provided on a second part of the third face of the housing,
   wherein the first region comprises a first display portion and a first positional data input portion overlapped with each other,
   wherein the second region comprises a second display portion and a second positional data input portion overlapped with each other,
   wherein the first positional data input portion is configured to supply first positional data to the arithmetic device,
   wherein the second positional data input portion is configured to supply second positional data to the arithmetic device, and
   wherein the arithmetic device is configured to supply first image data to the first display portion and second image data to the second display portion.

10. The data processor according to claim 9, wherein each of the first display portion and the second display portion comprises a transistor in which a channel formation region comprises oxide semiconductor.

11. The data processor according to claim 9, wherein the third region comprises a third display portion and a third positional data input portion overlapped with each other and the driver circuit portion.

12. The data processor according to claim 9,
wherein the input/output device further includes an FPC connected to the terminal portion, and
wherein the terminal portion is provided in the first region.

13. The data processor according to claim 9,
wherein the storage unit is configured to store a program to be executed by the arithmetic unit is stored,
wherein the program comprises:
a first step of allowing an interrupt processing;
a second step of selecting a third step when the second positional data is supplied or selecting a fourth step when the second positional data is not supplied;
the third step of generating the first image data based on the second positional data;
the fourth step of returning from the interrupt processing;
a fifth step of displaying the first image data on the first display portion;
a sixth step of selecting a seventh step when a termination instruction is supplied or selecting the fifth step when no termination instruction is supplied; and
the seventh step of terminating the program, and
wherein driving of the second positional data input portion is stopped during at least the fifth step.

14. The data processor according to claim 13, wherein the termination instruction is supplied from the second positional data input portion.

15. The data processor according to claim 9, wherein driving of the second positional data input portion is configured to be stopped when the housing is held by user's hand and the second region is covered with the user's hand.

16. The data processor according to claim 9,
wherein the storage unit is configured to store a program to be executed by the arithmetic unit, and
wherein the program comprises:
a first step of acquiring initial data including status data;
a second step of allowing an interrupt processing;
a third step of acquiring predetermined data;
a fourth step of selecting a fifth step when the status data shows a first status or selecting a sixth step when the status data shows a second status;
the fifth step of generating the first image data based on the predetermined data and displaying the first image data on the first display portion;
the sixth step of generating the second image data based on the predetermined data and displaying the second image data on the second display portion;
a seventh step of selecting an eighth step when a termination instruction is supplied in the interrupt processing or selecting the third step when no termination instruction is supplied in the interrupt processing; and
the eighth step of terminating the program, and
wherein driving of the second positional data input portion is stopped during at least the fifth step.

17. The data processor according to claim 16,
wherein the interrupt processing comprises:
a ninth step of selecting a tenth step when an instruction to set the status data is supplied or selecting an eleventh step when no instruction to set the status data is supplied;
the tenth step of updating the status data based on the supplied instruction; and
the eleventh step of returning from the interrupt processing.

18. The data processor according to claim 1, wherein an area of the first display portion is larger than an area of the second display portion.

19. The data processor according to claim 9, wherein an area of the first display portion is larger than an area of the second display portion.

20. The data processor according to claim 1, wherein the pixel portion includes the first display portion, the second display portion, the first positional data input portion, and the second positional data input portion.

21. The data processor according to claim 9, wherein the pixel portion includes the first display portion, the second display portion, the first positional data input portion, and the second positional data input portion.

* * * * *